(12) United States Patent
Lee et al.

(10) Patent No.: US 11,783,620 B2
(45) Date of Patent: Oct. 10, 2023

(54) DISPLAY DEVICE

(71) Applicant: SAMSUNG DISPLAY CO., LTD., Yongin-si (KR)

(72) Inventors: Jong Hyun Lee, Suwon-si (KR); Il Nam Kim, Hwaseong-si (KR); Kang Bin Jo, Suwon-si (KR); Dong Wook Yang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/662,901

(22) Filed: May 11, 2022

(65) Prior Publication Data

US 2023/0075463 A1 Mar. 9, 2023

(30) Foreign Application Priority Data

Sep. 3, 2021 (KR) .......................... 10-2021-0117517

(51) Int. Cl.
*G09G 3/3233* (2016.01)
*G06V 40/13* (2022.01)
*G09G 3/3208* (2016.01)

(52) U.S. Cl.
CPC ....... *G06V 40/1318* (2022.01); *G09G 3/3208* (2013.01); *G09G 2300/0842* (2013.01); *G09G 2310/061* (2013.01); *G09G 2310/08* (2013.01)

(58) Field of Classification Search
CPC .. G09G 3/3208; G09G 3/3225; G09G 3/3233; G09G 2310/061; G09G 2310/08; G09G 2300/0809; G09G 2300/0819; G09G 2300/0842; G09G 2360/14; G06V 40/1318
See application file for complete search history.

(56) References Cited

U.S. PATENT DOCUMENTS

| 10,714,554 | B2* | 7/2020 | Choo .................... G09G 3/3233 |
| 10,727,285 | B2 | 7/2020 | Chung et al. |
| 2011/0147596 | A1* | 6/2011 | Ishida .................. H04N 25/617 250/366 |
| 2013/0112886 | A1* | 5/2013 | Shin .................. H01L 27/14614 250/214 R |
| 2015/0364107 | A1* | 12/2015 | Sakariya ................. G06F 3/042 345/82 |

(Continued)

FOREIGN PATENT DOCUMENTS

KR 10-2021-0064483 6/2021

*Primary Examiner* — Calvin C Ma

(74) *Attorney, Agent, or Firm* — F. CHAU & ASSOCIATES, LLC

(57) ABSTRACT

A display device includes light emitting and receiving pixels, a reset line, a fingerprint scan line, a fingerprint sensing line, and first and second voltage lines in a display region. Each light receiving pixel includes a light receiving element including a first electrode and a second electrode connected to the second voltage line, a sensing transistor connecting the first electrode to the fingerprint sensing line according to a fingerprint scan signal applied to the fingerprint scan line and a reset transistor to connect the first voltage line to the first electrode according to a reset signal applied to the reset line. A first voltage applied to the first voltage line is greater than a second voltage applied to the second voltage line, and a third voltage applied to the fingerprint sensing line is greater than the second voltage and smaller than the first voltage.

20 Claims, 21 Drawing Sheets

(56) References Cited

U.S. PATENT DOCUMENTS

| | | | |
|---|---|---|---|
| 2018/0211088 A1* | 7/2018 | Cho | G09G 3/3233 |
| 2018/0374424 A1* | 12/2018 | In | H01L 51/5203 |
| 2020/0175245 A1 | 6/2020 | Ding et al. | |
| 2021/0176420 A1* | 6/2021 | Cheng | G09G 3/3225 |
| 2022/0075979 A1* | 3/2022 | Han | G09G 3/3233 |

* cited by examiner

DISPLAY DEVICE

CROSS-REFERENCE TO RELATED APPLICATION

This application claims priority under 35 U.S.C. § 119 to Korean Patent Application No. 10-2021-0117517, filed on Sep. 3, 2021, the disclosure of which is incorporated by reference herein in its entirety.

BACKGROUND

1. Technical Field

Embodiments of the present disclosure relate to a display device.

2. Description of the Related Art

Demand for display devices continues to increase, including those used in smartphones, digital cameras, laptop computers, navigation devices, smart televisions, and other electronic devices. Some display devices provide security and convenience using biometric information (e.g., fingerprint recognition, iris recognition, etc.). This information may be used to protect personal information stored in or otherwise accessed from the electronic device and/or to perform unlocking function of a display screen. When fingerprint recognition is used, the display device may perform a fingerprint sensing function in a display region of the screen.

SUMMARY

Aspects of the present disclosure provide a display panel in which light receiving pixels performing a fingerprint sensing function are smoothly reset before being exposed to light, and a display device including the same.

According to an embodiment of the present disclosure, light emitting pixels and light receiving pixels disposed in a display region, and a reset line, a fingerprint scan line, a fingerprint sensing line, a first voltage line, and a second voltage line disposed in the display region. Each of the light receiving pixels includes a light receiving element including a first electrode and a second electrode connected to the second voltage line, a sensing transistor connecting the first electrode of the light receiving element to the fingerprint sensing line according to a fingerprint scan signal applied to the fingerprint scan line, and a reset transistor connecting the first voltage line to the first electrode of the light receiving element according to a reset signal applied to the reset line. A first voltage applied to the first voltage line is greater than a second voltage applied to the second voltage line, and a third voltage applied to the fingerprint sensing line is greater than the second voltage and smaller than the first voltage.

In an embodiment, a voltage difference between the first voltage and the second voltage may be greater than a threshold voltage of the light receiving element.

In an embodiment, the light receiving pixel may further include a sensing node disposed between the first electrode of the light receiving element and the sensing transistor, and In an embodiment, a voltage of the sensing node may increase during a period in which the light receiving pixel is exposed to light.

In an embodiment, the reset signal and the fingerprint scan signal may be different signals.

In an embodiment, the reset transistor may be turned on twice or more during one frame period.

In an embodiment, the light receiving element may operate in a forward bias state during a period in which the reset transistor is turned on.

In an embodiment, the display device may further include a first scan line, an initialization voltage line, and a second scan line. Each of the light emitting pixels may include a light emitting element including a first electrode and a second electrode connected to the second voltage line, a first transistor disposed between the light emitting element and the first voltage line, and a second transistor initializing a voltage of a gate electrode of the first transistor to an initialization voltage of the initialization voltage line according to a first scan signal of the first scan line.

In an embodiment, the first transistor may be a P-type transistor, and the sensing transistor and the second transistor are N-type transistors.

In an embodiment, the first scan signal and the fingerprint scan signal may be the same signal.

In an embodiment, the first scan signal and the reset signal may be different signals.

In an embodiment, the display device may further include a data line connected to the light emitting pixel. Each of the light emitting pixels may further include a third transistor applying a data voltage of the data line to a first electrode of the first transistor according to a second scan signal of the second scan line, and a fourth transistor connecting the gate electrode and a second electrode of the first transistor to each other according to the second scan signal. The second scan signal may be a signal different from the first scan signal and the reset signal.

In an embodiment, a period in which the reset transistor is turned on by the reset signal may be longer than a period in which each of the third transistor and the fourth transistor is turned on by the second scan signal.

In an embodiment, the reset transistor may be turned on at least twice during a period in which the second transistor is turned on by the second scan signal.

According to an embodiment of the present disclosure, a display device includes a plurality of fingerprint scan lines to which first scan signals are applied, a first voltage line to which a first voltage is applied, a second voltage line to which a second voltage smaller than the first voltage is applied, a plurality of fingerprint sensing lines to which a third voltage smaller than the first voltage and greater than the second voltage is applied, a reset line to which a reset signal is applied, a reset transistor controlled by the reset signal and including a first electrode connected to the first voltage line, and light receiving pixels each connected to any one of the plurality of fingerprint scan lines, any one of the plurality of fingerprint sensing lines, and the second voltage line. Each of the light receiving pixels may include a light receiving element including a first electrode and a second electrode connected to the second voltage line, a sensing transistor connecting the first electrode of the light receiving element to the fingerprint sensing line according to a scan signal applied to the fingerprint scan line, and a connection line connecting the first electrode of the light receiving element to a second electrode of the reset transistor.

In an embodiment, a period in which the sensing transistor is turned on by the first scan signals and a period in which the reset transistor is turned on by the reset signal may not overlap each other.

According to an embodiment of the present disclosure, a display device includes a display region having a fingerprint sensing region therein, and a non-display region disposed around the display region. The fingerprint sensing region may include a plurality of light emitting pixels and a plurality of light receiving pixels alternately arranged in a matrix direction. Each of the plurality of light emitting pixels may include a light emitting element including a first electrode and a second electrode connected to a second voltage line, a first transistor disposed between the light emitting element and a first voltage line, and a second transistor initializing a voltage of a gate electrode of the first transistor to an initialization voltage of an initialization voltage line according to a first scan signal of a first scan line. Each of the plurality of light receiving pixels may include a light receiving element including a first electrode and a second electrode connected to the second voltage line, a sensing transistor connecting the first electrode of the light receiving element to a fingerprint sensing line according to a fingerprint scan signal applied to a fingerprint scan line, and a reset transistor connecting the first voltage line to the first electrode of the light receiving element according to a reset signal applied to a reset line.

In an embodiment, the first scan signal and the reset signal may be different signals.

In an embodiment, each of the plurality of light emitting pixels may further include a third transistor applying a data voltage of a data line to a first electrode of the first transistor according to a second scan signal of a second scan line, and the second scan signal is a signal different from the first scan signal and the reset signal.

In an embodiment, the second scan signal and the fingerprint scan signal may be the same signal.

In an embodiment, the light receiving element may operate in a forward bias state during a period in which the reset transistor is turned on by the reset signal.

In a display device including the embodiments of the present disclosure, a plurality of light emitting pixels and a plurality of light receiving pixels including a fingerprint sensing function may be disposed on a display panel, and a reset timing and the number of times of reset for initializing sensing nodes and light emitting elements of the respective light receiving pixels may be adjusted, such that the light receiving pixels may be smoothly reset before being exposed to light.

BRIEF DESCRIPTION OF THE DRAWINGS

The above and other features of the present disclosure will become more apparent by describing in detail embodiments thereof, with reference to the accompanying drawings, in which.

DETAILED DESCRIPTION OF THE EMBODIMENTS

Figure 1:
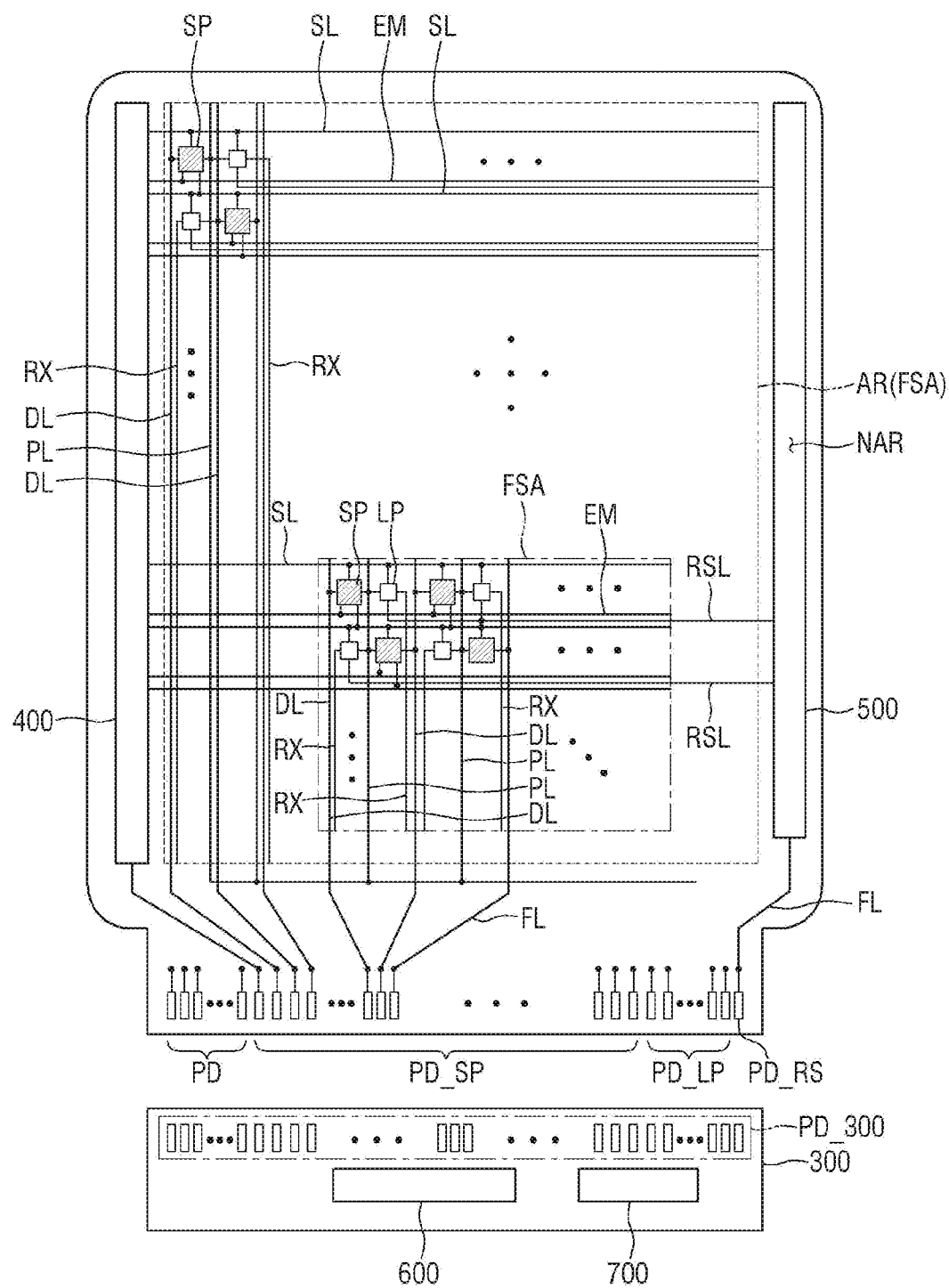
FIG. 1 illustrates an embodiment of a display device.

Embodiments of the present disclosure will be described more fully hereinafter with reference to the accompanying drawings. Like reference numerals may refer to like elements throughout the specification and the accompanying drawings.

Herein, when two or more elements or values are described as being substantially the same as or about equal to each other, it is to be understood that the elements or values are equal to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to example embodiments, the parameter may be exactly the certain value or approximately the certain value within a measurement error as would be understood by a person having ordinary skill in the art. Other uses of these terms and similar terms to describe the relationship between components should be interpreted in a like fashion.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

As used herein, the singular forms "a", "an" and "the" are intended to include the plural forms as well, unless the context clearly indicates otherwise.

Spatially relative terms, such as "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" may encompass both an orientation of above and below.

When a feature is said to extend, protrude, or otherwise follow a certain direction, it will be understood that the feature may follow said direction in the negative, i.e., opposite direction. Accordingly, the feature is not limited to follow exactly one direction, and may follow along an axis formed by the direction, unless the context clearly indicates otherwise.

FIG. 1 is a plan view of a display device according to an example embodiment. In FIG. 1, a first direction X, a second direction Y, and a third direction Z are indicated. The first direction X is a direction parallel to one side of a display device in plan view and may be, for example, a transverse direction of the display device. The second direction Y is a direction parallel to another side in contact with one side of the display device in plan view, and may be a longitudinal direction of the display device. For convenience of explanation, one side in the first direction X will refer to a right direction in plan view, the other side in the first direction X will refer to a left direction in plan view, one side in the second direction Y will refer to an upper direction in plan view, and the other side in the second direction Y will refer to a lower direction in plan view. The third direction Z may be a thickness direction of the display device. However, it should be understood that directions mentioned in example embodiments refer to relative directions, and example embodiments are not limited to the mentioned directions.

Referring to FIG. 1, a display device may include various electronic devices that include a display screen. Examples of the display device include, but are limited to, mobile phones, smartphones, tablet personal computers (PCs), mobile communication terminals, electronic notebooks, electronic books, personal digital assistants (PDAs), portable multimedia players (PMPs), navigation devices, ultra mobile PCs (UMPCs), televisions, game machines, wrist watch-type electronic devices, head-mounted displays, monitors of personal computers, laptop computers, vehicle instrument boards, digital cameras, camcorders, external billboards, electric signs, various medical devices, various inspection devices, various home appliances including display regions, such as refrigerators and washing machines, Internet of Things (IoT) devices, or the like. Representative examples of a display device to be described later may include, but are not limited to, smartphones, tablet PCs, laptop computers, or the like.

The display device may have a predetermined shape (e.g., substantially rectangular shape or square shape) in plan view. In one embodiment, the display device may have a rectangular shape with rounded corners or a rectangular shape with vertical corners in plan view. The display device may include four sides or edges. However, the shape of the display device in plan view is not limited to a quadrangular shape and may be various shapes, such but not limited to, other polygonal shapes, a circular shape, or an elliptical shape.

At least one of a front surface or a rear surface of the display device may be a display surface. The "front surface" may refer to a surface (one surface) positioned on one side of one plane, and the "rear surface" may refer to a surface (the other surface, that is, an opposite surface to one surface) positioned on the other side of one plane. In an example embodiment, the display surface may be positioned on the front side of the display device, and display may not be performed in the rear direction. Hereinafter, such an example embodiment will be mainly described, but the display device may be a double-sided display device in which display is performed on both the front surface and the rear surface.

The display device includes an active region AR and a non-active region NAR. In the display device, one portion that includes a display screen may be referred to as a display region. Another portion that does not display a screen may be referred to as a non-display region. Another region in which sensing of a touch input is performed may be referred to as a touch region. In one embodiment, the display region and the touch region may be included in the active region AR and may overlap each other. For example, the active region AR may be a region in which both of the display and the sensing of the touch input are performed. The active region AR may have a predetermined shape, e.g., a rectangular shape or a rectangular shape with rounded corners. As an example, the illustrated active region AR has a rectangular shape of which corners are rounded and the second direction Y is longer than the first direction X. However, the present disclosure is not limited thereto, e.g., the active region AR may have a rectangular shape of which the first direction X is longer than the first direction X or may have various shapes such as a square shape, other polygonal shapes, a circular shape, or an elliptical shape.

In addition, the display device includes a fingerprint sensing region FSA. In one embodiment, the fingerprint sensing region FSA of the display device may overlap the active region AR. For example, the fingerprint sensing region FSA may be disposed in a central region of a lower side of the active region AR, but is not limited thereto. The position where the fingerprint sensing region FSA is disposed may vary among embodiments. In another example embodiment, the fingerprint sensing region FSA and the active region AR may also be substantially the same region. For example, the active region AR may also be a region in which the display is located, sensing of a touch input is performed, and sensing of a fingerprint is also performed. Hereinafter, as an example, it will be mainly described that the fingerprint sensing region FSA is a portion of the active region AR.

The non-active region NAR is disposed around the active region AR. In one embodiment, the non-active region NAR may be a bezel region. The non-active region NAR may surround all sides (four sides in FIG. 1) of the active region AR. However, the present disclosure is not limited thereto. For example, the non-active region NAR may be disposed only around three (or fewer) sides of the active region AR. In this case, the other side of the active region AR may form an edge of the display device.

Signal lines or driving circuits may apply signals to the active region AR (e.g., display region or touch region) and may be disposed in the non-active region NAR. In addition, signal lines or driving circuits may apply signals to the fingerprint sensing region FSA, and sensing lines for transferring electrical signals transferred from the fingerprint sensing region FSA may be disposed in the non-active region NAR. The non-active region NAR may not include the display region. Furthermore, the non-active region NAR may not include the fingerprint sensing region FSA and the touch region. In one example embodiment, the non-active region NAR may also include a portion of the fingerprint sensing region FSA and/or a portion of the touch region. The non-active region NAR may also be substantially the same region as the non-display region where the screen is not displayed.

Figure 2:
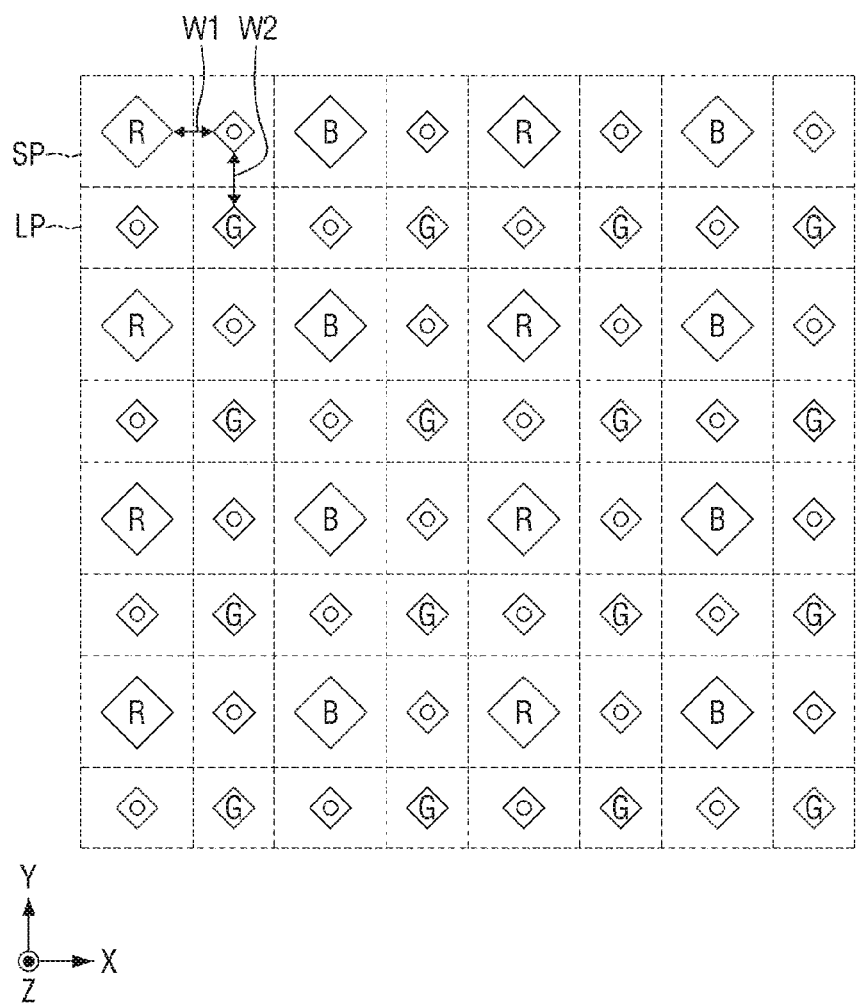
FIG. 2 illustrates an embodiment of light emitting pixels and light receiving pixels in a fingerprint sensing region.

FIG. 2 is a plan view illustrating an embodiment of an arrangement structure in plan view, where the arrangement structure may include a plurality of light emitting pixels and a plurality of light receiving pixels in a fingerprint sensing region.

Figure 3:
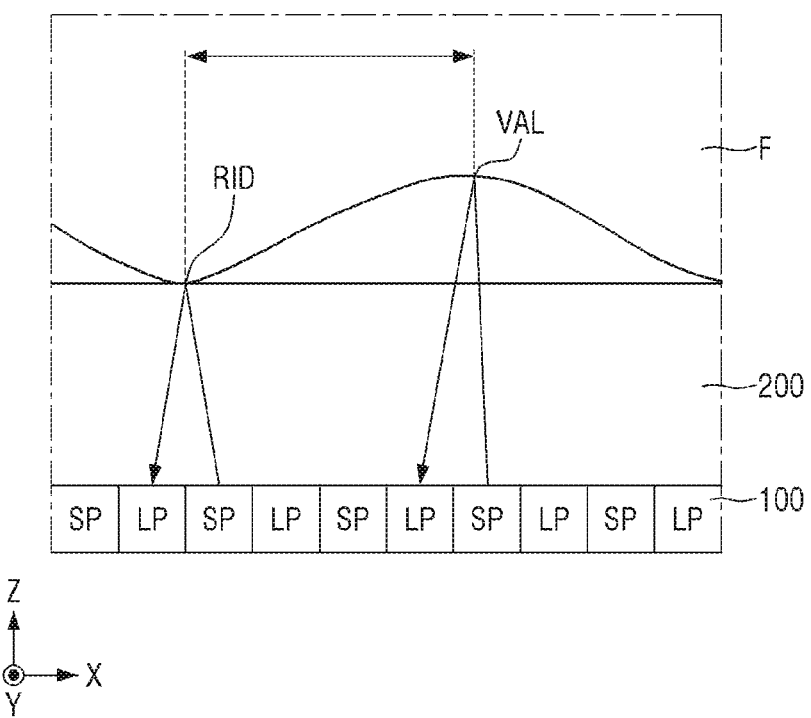
FIG. 3 illustrates an embodiment of a fingerprint sensing method of a display device.

FIG. 3 is a schematic cross-sectional view for describing an embodiment of a fingerprint sensing method of the display device. For example, FIG. 3 illustrates a cross-section of a portion of the display region overlapping the fingerprint sensing region FSA according to an example embodiment, but the present disclosure is not limited thereto. In one embodiment, when the fingerprint sensing region FSA is disposed to be substantially the same as the display region as described above, such a cross-sectional arrangement shape may be equally applied to the entire display region.

Referring to FIGS. 2 and 3, the display device may include a display panel 100 and a cover window 200. The display panel 100 may include a plurality of light emitting elements and a plurality of light receiving elements, and the cover window 200 may be disposed on the display panel 100.

In one embodiment, the cover window 200 may be disposed on a front surface of the display panel 100 so as to cover the front surface of the display panel 100. The cover window 200 may serve to protect the front surface of the display panel 100 and may be attached to the front surface of the display panel 100, for example, through a transparent adhesive member. The cover window 200 may be made of a transparent material such as glass or plastic. When the cover window is made of the glass, the cover window may include ultra-thin glass (UTG) having a thickness of about 0.1 mm or less to have flexible properties. When the cover window includes plastic, the cover window 200 may include, for example, a transparent polyimide film or another material.

The display panel 100 may be disposed on a rear surface of the cover window 200, and in one embodiment may be a light emitting display panel 100 including light emitting elements. For example, the display panel 100 may include a self-light emitting display panel. Examples include an organic light emitting display panel using an organic light emitting diode including an organic light emitting layer, a micro light emitting diode display panel using a micro light emitting diode (LED), a quantum dot light emitting display panel using a quantum dot light emitting diode including a quantum dot light emitting layer, or an inorganic light emitting display panel using an inorganic light emitting diode including an inorganic semiconductor. Hereinafter, for illustrative purposes an organic light emitting display panel will be described as an example of the display panel 100. Unless the organic light emitting display panel is not to be specially distinguished from the display panel, the organic light emitting display panel applied to an example embodiment will be simply abbreviated as the display panel 100. However, an example embodiment is not limited to the organic light emitting display panel, and other display panels including but not limited to those listed above may be applied within the scope of the technical spirit.

The fingerprint sensing region FSA of the display panel 100 may include a plurality of light emitting pixels SP and a plurality of light receiving pixels LP. In one embodiment, the light emitting pixels SP and light receiving pixels LP may be sequentially and alternately arranged in a matrix direction. The shape of the pixels may be a predetermined shape (e.g., rectangular shape or a square shape) in a plan view, but is not limited thereto. In one embodiment, one or more pixels may be a rhombic shape with each side inclined with respect to the second direction Y.

One or more of the light emitting pixels SP may include a driving transistor, at least one transistor, a light emitting element, and a capacitor. The driving transistor and the at least one transistor may be, for example, thin film transistors. The light emitting element may be an organic light emitting diode including a first electrode, an organic light emitting layer, and a second electrode. The light emitting element may be another type of device and/or may have a different structure in another embodiment. The light emitting element may emit light according to a driving current of the driving transistor. The capacitor may maintain a data voltage applied to a gate electrode of the driving transistor at a constant level for at least a predetermined time.

One or more of the light receiving pixels LP may include two thin film transistors and a light receiving element. The light receiving element may be an organic photodiode including a first electrode, a second electrode, and a photoelectric conversion layer disposed between the first electrode and the second electrode. In one embodiment, he photoelectric conversion layer may include a donor layer, an acceptor layer, and a donor-acceptor mixed layer. When the light receiving element is exposed to external light, the photoelectric conversion layer may generate photocharges in proportion to an amount of exposed light. However, the present disclosure is not limited thereto. For example, the light receiving element may be a photodiode having a PIN structure including semiconductor layers formed as an N-type semiconductor layer, an intrinsic (I-type) semiconductor layer and a P-type semiconductor layer, or may be a photodiode having a PN structure including semiconductor layers formed as an N-type semiconductor layer and a P-type semiconductor layer. In one embodiment, the light receiving element may be a photo transistor.

In one embodiment, the light emitting pixels SP and the light receiving pixels LP may be sequentially and alternately disposed in the first direction X and the second direction Y in the matrix direction in plan view, e.g., one light receiving pixel LP may be disposed between the two light emitting pixels SP. In one arrangement, the light emitting pixels SP of substantially the same colors may be disposed in the like columns in the second direction Y. For example, light emitting pixels SP including light emitting elements of a first color (e.g., red R) may be sequentially disposed in a first column, light emitting pixels SP including light emitting elements of a second color (e.g., green G) may be sequentially disposed in a second column, and light emitting pixels SP including light emitting elements of a third color (e.g., blue B) may be sequentially disposed in a third column.

The light emitting pixels SP including light emitting elements of the first color R and light emitting elements of the third color B may be sequentially and alternately disposed in odd-numbered rows in the first direction X. Light emitting elements of the second color G may be sequentially disposed in even-numbered rows in the first direction X.

As a non-restrictive example, one or more of the light emitting elements of the first color R and the light emitting elements of the third color B may be formed to have a greater area than the light emitting elements of the second color G. Also, the light emitting elements of the third color B may be formed to have a greater area than the light emitting elements of the first color R. The positions and sizes of the areas occupied by the light emitting elements of the first to third colors may be variously modified according to resolution or the like in other embodiments.

The light receiving pixels LP may be disposed between the light emitting elements of the first color R and between the light emitting elements of the third color B in odd-numbered columns in the second direction Y, and also may be disposed between the light emitting elements of the second color G in even-numbered columns in the second direction Y. In one embodiment, the ratio between the light emitting pixels SP and the light receiving pixels LP disposed in the fingerprint sensing region FSA may be 1:1, but may be a different ratio in another embodiment.

FIG. 3 is a cross-sectional view illustrating a state in which a user's finger touches the cover window 200 of the display device according to an embodiment. In FIG. 3, there is shown as an example a ridge RID of a fingerprint F and a valley VAL that is adjacent to the ridge RID.

When the user's finger touches the cover window 200, light emitted from the light emitting pixels SP may be reflected from the ridge RID and the valley VAL of the fingerprint F, respectively. In this case, an amount of light reflected from the ridge RID of the fingerprint F and an amount of light reflected from the valley VAL of the fingerprint F may be different from each other. Therefore, amounts of photocharges generated by the light receiving element(s) exposed to the light reflected from the ridge RID and the light receiving element(s) exposed to the light reflected from the valley VAL may be different from each other. Also, the magnitudes of voltages and currents of first electrodes of the light receiving elements exposed to the light reflected from the ridge RID and the light receiving element exposed to the light reflected from the valley VAL may be different from each other. In this way, the user's fingerprint may be sensed by measuring and analyzing a change in magnitude of an electrical signal of the light receiving elements.

As described above, the light emitting pixels SP and the light receiving pixels LP may be alternately disposed, but the present disclosure is not limited thereto. In other embodiments, the arrangement structures of the light emitting pixels SP and the light receiving pixel LP may be different, for example, according to resolution of the display panel 100, a thickness of the cover window 200 on the display panel 100, materials, or the like.

The width by which the ridge RID and the valley VAL of the finger are spaced apart from each other may be, for example, approximately 100 to 150 μm. The width by which adjacent light receiving pixels LP are spaced apart from each other may be less than the width by which the ridge RID and the valley VAL of the finger are spaced apart from each other. Accordingly, this may increase accuracy of recognition of the user's fingerprint. According to an example embodiment, the width by which the light receiving pixels LP are spaced apart from each other may be greater than approximately 30 μm and less than 100 μm.

In addition, the width W1 by which the light receiving element and the light emitting element are spaced apart from each other in the first direction X and the width W2 by which the light receiving element and the light emitting element are spaced apart from each other in the second direction Y may be different from each other. However, in one embodiment each of the width W1 by which the light receiving element and the light emitting element are spaced apart from each other in the first direction X and the width W2 by which the light receiving element and the light emitting element are spaced apart from each other in the second direction Y may be greater than approximately 16 μm and less than 50 μm.

Figure 4:
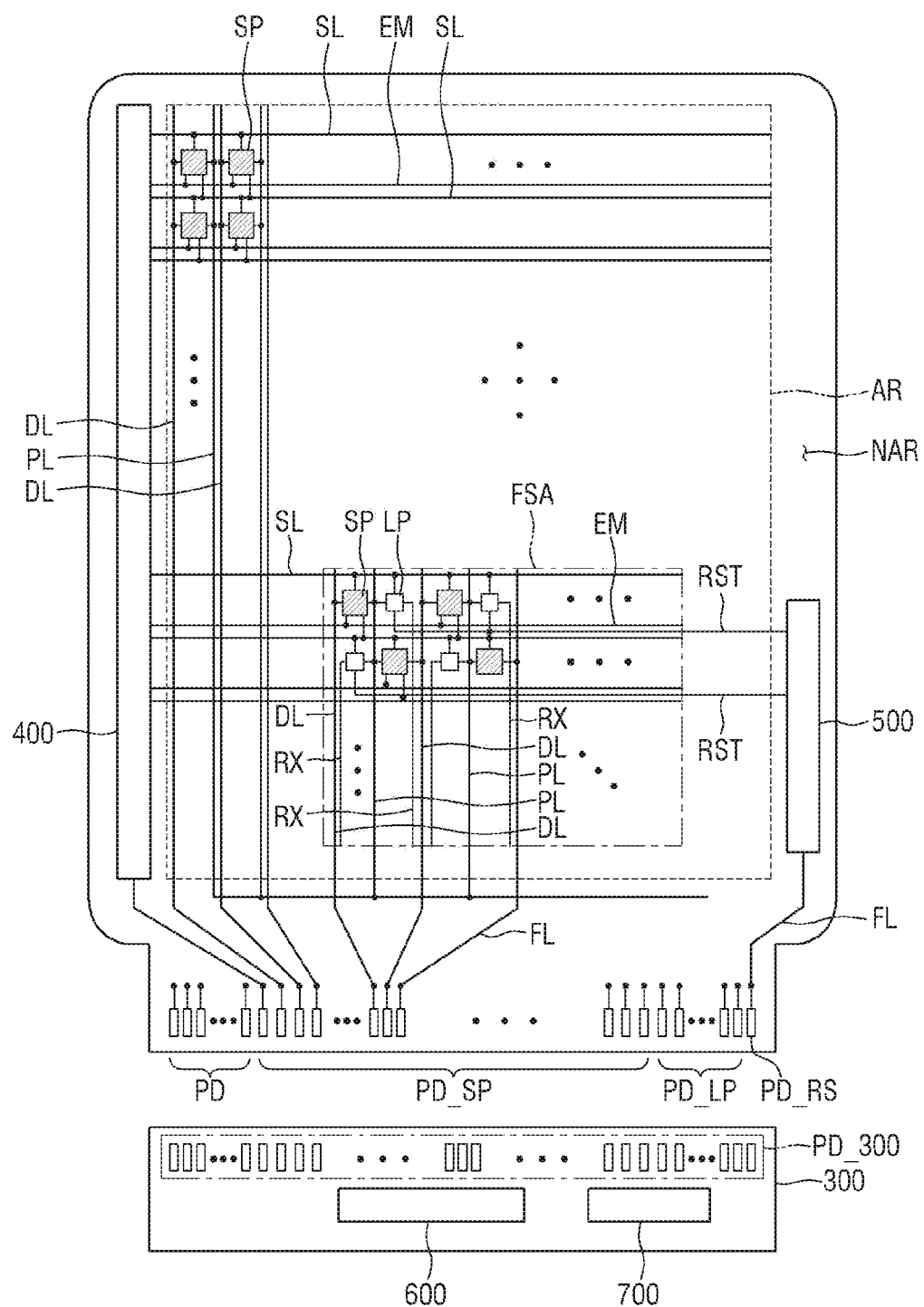
FIG. 4 illustrates an embodiment of a display panel.
Figure 5:
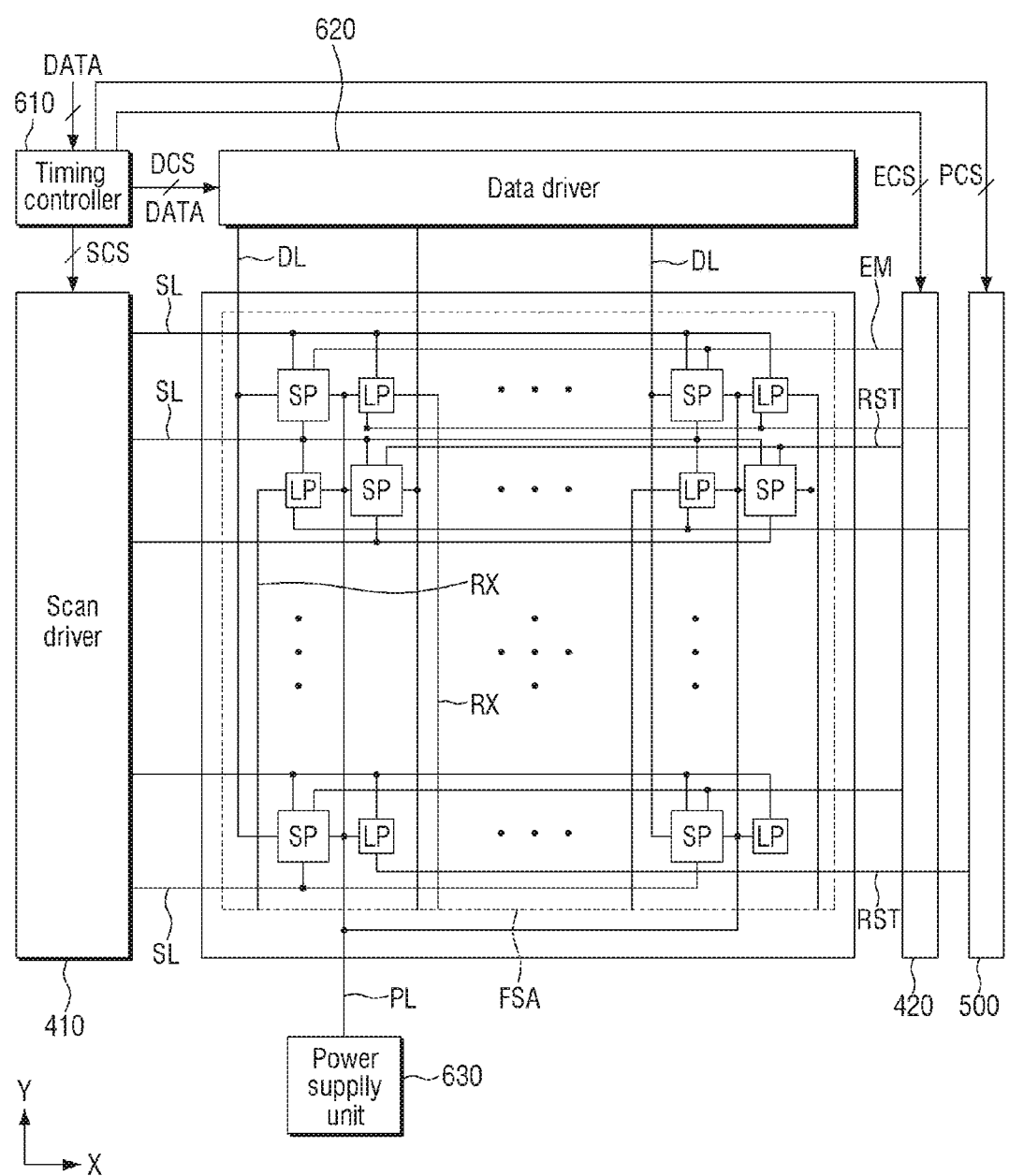
FIG. 5 illustrates an embodiment of a display device.
Figure 6:
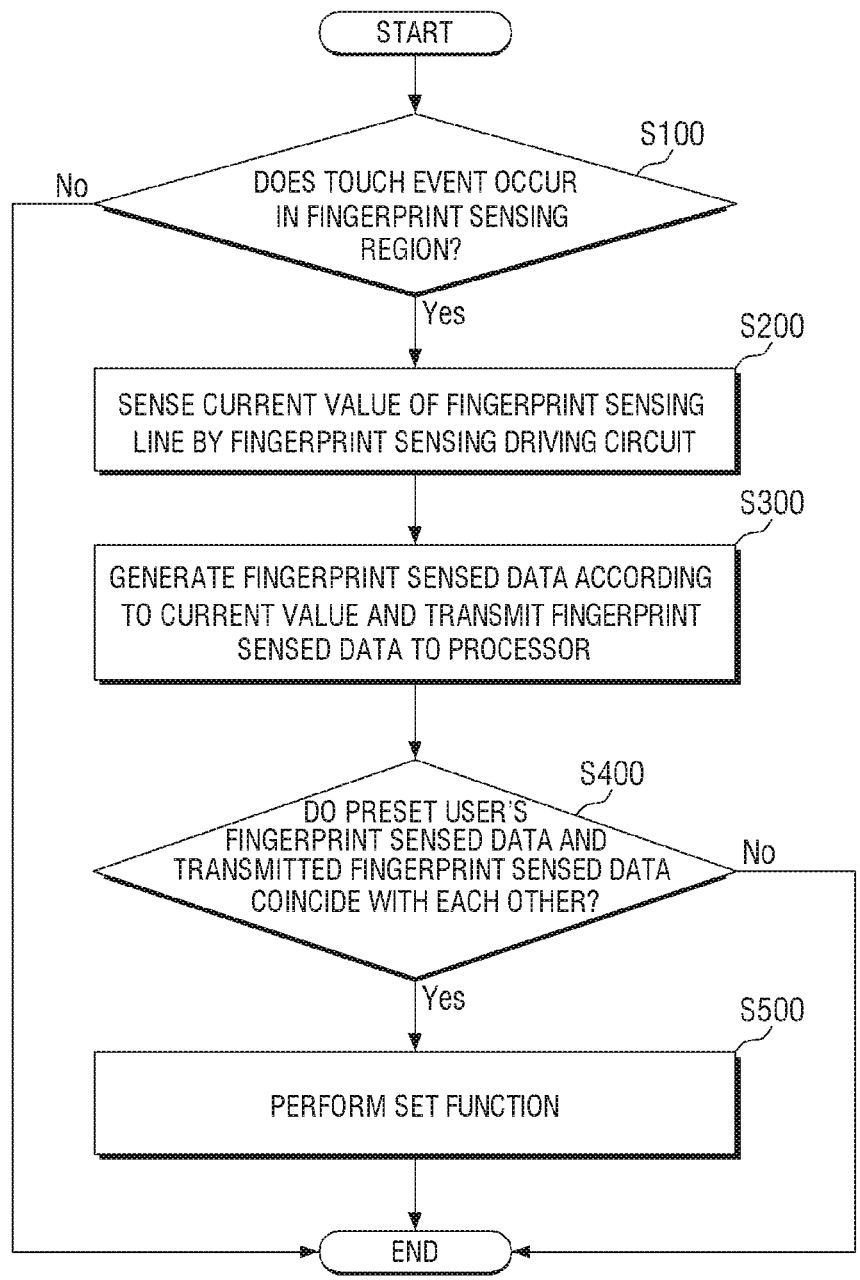
FIG. 6 illustrates an embodiment of a fingerprint sensing and analyzing method of a display device.

FIG. 4 is a schematic plan view of a display panel according to an example embodiment. FIG. 5 is a schematic block diagram of the display device according to an example embodiment. FIG. 6 is a flowchart illustrating an example of a fingerprint sensing and analyzing method of the display device. In FIG. 5, in a case of the display panel 100, the fingerprint sensing region FSA has been illustrated in an enlarged form for convenience of explanation.

Referring to FIGS. 4 and 5, scan lines and driving voltage lines connected to the light emitting pixels SP and the light receiving pixels LP, emission lines EM and data lines DL connected to the light emitting pixel SP, and reset lines RST and fingerprint sensing lines RX connected to the light receiving pixels LP may be disposed in the fingerprint sensing region FSA of the display panel 100. The scan lines SL, the emission lines EM, and the reset lines RST may extend in the first direction X. The data lines DL, the driving voltage lines PL, and the fingerprint sensing lines R may extend in the second direction Y crossing the first direction X. The driving voltage lines PL may extend in the second direction Y in the active region AR and may be connected to each other in the non-active region NAR.

One or more of the light emitting pixels SP may be connected to at least one of the scan lines SL, one of the data lines DL, at least one of the emission lines EL, and the driving voltage line PL. It has been illustrated in FIG. 4 that the light emitting pixels SP is connected to two scan lines SL, but example embodiments are not limited thereto. For example, one or more of the light emitting pixels SP may also be connected to three or more scan lines SL. The light receiving pixels LP may be connected to one of the scan lines SL, one of the reset lines RST, one of the fingerprint sensing lines RX, and the driving voltage line PL.

The non-active region NAR of the display panel 100 may include a scan driving circuit 400 for applying scan signals to the scan lines SL, a reset driving circuit 500 for applying reset signals to the reset lines RST, and fan-out lines FL and pads PD_LP and PD_SP for electrically connecting the display panel 100 and a display driving circuit 600 to each other. Embodiments of the scan driving circuit 400, the reset driving circuit 500, the fan-out lines FL, and the pads PD_LP and PD_SP are described below.

The display device may further include a display circuit board 300 disposed in the non-active region NAR at a lower end of the display panel 100, and the display driving circuit 600, and a fingerprint sensing driving circuit 700 may be disposed on the display circuit board 300. The display circuit board 300 may be attached to a lower end of the display panel 100, for example, using a conductive adhesive member such as an anisotropic conductive film. Therefore, the display circuit board 300 may be electrically connected to the display panel 100 and the display driving circuit 600. The display panel 100 and the display driving circuit 600 may receive digital video data DATA, timing signals, and driving voltages through the display circuit board 300. In one embodiment, the display circuit board 300 may be a flexible film such as a flexible printed circuit board, a printed circuit board, or a chip on film.

The display driving circuit 600 may generate signals and voltages for driving the light emitting pixels SP of the display panel 100. The display driving circuit 600 may be formed as an integrated circuit (IC) and attached to the display circuit board 300 in a chip on film (COF) manner, but is not limited thereto. For example, the display driving circuit 600 may be attached onto the non-active region NAR of the display panel 100 in a chip on glass (COG) manner, a chip on plastic (COP) manner, or an ultrasonic bonding method.

The fingerprint sensing driving circuit 700 may generate signals and voltages for driving the light receiving pixels LP of the display panel 100 and sense a change in current of the light receiving pixels LP. The fingerprint sensing driving circuit 700 may be formed as an integrated circuit (IC) and attached to the display circuit board 300 in a chip on film (COF) manner, but is not limited thereto. For example, the fingerprint sensing driving circuit 700 may be attached onto the non-active region NAR of the display panel 100 in a chip on glass (COG) manner, a chip on plastic (COP) manner, or an ultrasonic bonding method. It has been illustrated in FIG. 4 that the display driving circuit 600 and the fingerprint sensing driving circuit 700 are each formed as the integrated circuits. In some cases, the display driving circuit 600 and the fingerprint sensing driving circuit 700 may be integrated and formed as one integrated circuit.

The display driving circuit 600 may include a timing controller 610, a data driver 620, and a power supply unit 630, as illustrated in FIG. 5. The timing controller 610 may generate a scan control signal SCS for controlling an operation timing of a scan driver 410 and an emission control signal ECS for controlling an operation timing of an emission control driver 420. For example, the timing controller 610 may generate the scan control signal SCS and the emission control signal ECS, output the scan control signal SCS to the scan driver 410 through a scan control line, and output the emission control signal ECS to the emission control driver 420 through an emission control line.

In addition, the timing controller 610 may output the digital video data DATA and a data control signal DCS to the data driver 620. The data driver 620 may convert the digital video data to analog data voltages and output the analog data voltages to the data lines DL through the fan-out lines FL.

The power supply unit 630 may generate a first driving voltage ELVDD and supply the first driving voltage ELVDD to a first driving voltage line ELVDDL, and may generate a second driving voltage ELVSS and supply the second driving voltage ELVSS to a second driving voltage line ELVSSL. The driving voltage line PL may include the first driving voltage line ELVDDL and the second driving voltage line ELVSSL. The first driving voltage ELVDD may be a high-potential voltage for driving the organic light emitting diodes and the photodiodes. The second driving voltage ELVSS may be a low-potential voltage for driving the organic light emitting diodes and the photodiodes, e.g., the first driving voltage ELVDD may have a higher potential than the second driving voltage ELVSS.

In one embodiment, the light receiving pixels LP may share the first driving voltage ELVDD and the second driving voltage ELVSS for driving the organic light emitting diodes of the light emitting pixels SP to drive the photodiodes. In this case, separate voltage lines for driving the photodiodes may be omitted in manufacturing the display panel 100. According to such a structure, a separate voltage supply unit and voltage lines for driving the light receiving pixels LP are not required. This may allow the display panel 100 to be easily manufactured, may allow manufacturing costs of the display panel 100 to be decreased, and may allow spaced distances between the light receiving pixel LP and the light emitting pixel SP and between the light emitting pixels SP to be decreased, which may improve resolution.

The fingerprint sensing driving circuit 700 may include a fingerprint sensor and a reset signal generator. The fingerprint sensor may measure a magnitude of current of each of the light receiving pixels LP through the fingerprint sensing line RX. The fingerprint sensor may generate fingerprint sensed data according to the magnitude of the current sensed by each light receiving pixel LP, and may transmit the fingerprint sensed data to a processor. The processor may determine whether or not a fingerprint coincides with the user's fingerprint through a comparison with a preset fingerprint by analyzing the fingerprint sensed data.

Referring to FIG. 6, first, the display device may determine whether or not a touch by the user's finger has occurred in the fingerprint sensing region FSA (S100 in FIG. 6). When the touch by the user's finger occurs on the front surface of the display device, the light emitted from the light emitting pixel SP (as described above) may be reflected from the user's fingerprint and received by the light receiving element. This may cause the current magnitude of the fingerprint sensing line RX connected to the light receiving element to change. In this case, when the current magnitude is within a preset current magnitude range, the display device may determine that there is the touch by the user's finger.

In addition, the display device may include a touch member for sensing a touch input. The touch member may sense a touch input, for example, by a part (e.g., a finger) of the body on the front surface of the display device. The touch member may be provided as a separate panel or film from the display panel 100 and may be attached onto the display panel 100 or may be provided in the form of a touch layer inside the display panel 100. Accordingly, the display device may determine whether or not there is a touch by the user's finger by analyzing an electrical signal of the touch member.

Then, when the touch by the user's finger has occurred in the fingerprint sensing region FSA, the fingerprint sensing driving circuit 700 may sense a current value of the fingerprint sensing line RX (S200 in FIG. 6), and may generate fingerprint sensed data according to the current value of the fingerprint sensing line RX and transmit the fingerprint sensed data to the processor (e.g., a main processor or other processing logic) of the display device (S300 of FIG. 6).

The fingerprint sensor of the fingerprint sensing driving circuit 700 may include an analog-to-digital converter (AD converter) for converting the current value of the fingerprint sensing line RX to digital data. Accordingly, the fingerprint sensing driving circuit 700 may transmit the fingerprint sensed data converted to the digital data to the processor, e.g., a main processor or other type of processing logic.

Then, the processor may confirm whether or not preset user's fingerprint sensed data and the fingerprint sensed data transmitted from the fingerprint sensing driving circuit 700 coincide with each other (S400 in FIG. 6). The processor may perform set functions (S600 in FIG. 5) when the preset user's fingerprint sensed data and the fingerprint sensed data transmitted from the fingerprint sensing driving circuit 700 coincide with each other. The set functions may include one or more predetermined functions, e.g., unlocking a screen of the display device and/or an application, a function of approving a purchase, or another function.

Referring to FIGS. 4 and 5 again, the reset signal generator of the fingerprint sensing driving circuit 700 may generate a reset control signal PCS for controlling operation timing of the reset driving circuit 500. The reset signal generator may generate the reset control signal PCS and output the reset control signal PCS to the reset driving circuit 500 through the fan-out lines.

As described above, the scan driving circuit 400, the reset driving circuit 500, the fan-out lines FL, and the pads PD_SP, PD_LP, and PD_RS may be disposed in the non-active region NAR of the display panel 100. The fan-out lines FL and the pads PD_SP, PD_LP, and PD_RS may be disposed in the non-active region NAR positioned below the active region AR in the non-active region NAR of the display panel 100. The pads PD_SP, PD_LP, and PD_RS may include display pads PD_SP electrically connecting the data lines DL and the driving voltage line PL to the display driving circuit 600. The data lines DL and the driving voltage line PL are connected to respective light emitting pixels SP and the fan-out lines FL. The light emitting pixels SP and one or more of the fan-out lines FL are connected to the scan driving circuit 400. The fingerprint sensing lines RX are connected to the respective light receiving pixels LP and the fan-out lines FL, and the fingerprint pads PD_LP and PD_RS electrically connect the reset driving circuit 500 to the fingerprint sensing driving circuit 700.

The data lines DL and the driving voltage line PL (which are connected to the respective light emitting pixels SP) may be electrically connected to the display pads PD_SP by the fan-out lines FL. The fingerprint sensing lines RX connected to respective light receiving pixels SP may be electrically connected to the fingerprint pads PD_LP by corresponding fan-out lines FL.

The display pads PD_SP and the fingerprint pads PD_LP and PD_RS may be connected to pads PD_300 on the display circuit board 300, to electrically connect the data lines DL and the driving voltage line PL to the display driving circuit 600 and electrically connect the fingerprint sensing lines RX to the fingerprint sensing driving circuit 700.

The scan driving circuit 400 may receive the scan control signal SCS and the emission control signal ECS from the display driving circuit 600 through the fan-out lines FL. The scan driving circuit 400 may generate scan signals according to the scan control signal SCS and sequentially output the scan signals to the scan lines. In addition, the emission control driver 420 may generate emission signals according to the emission control signal ECS and sequentially output the emission signals to the emission lines EM.

The scan driving circuit 400 may include the scan driver 410 and the emission control driver 420. The scan driving circuit 400 may be disposed in the non-active regions NAR on both sides of the active region AR. As a non-restrictive example, the scan driver 410 may be disposed in the non-active region NAR on the left side of the active region AR, and the emission control driver 420 may be disposed in the non-active region NAR on the right side of the active region AR. As described above, the scan driving circuit 400 may be distributed and disposed in the non-active regions NAR on both sides of the active region AR, which in some cases may decrease an area of the bezel region of the display device. However, example embodiments are not limited thereto. For example, the scan driving circuit 400 may be disposed only in the non-active region NAR on any one of both sides of the active region AR.

The reset driving circuit 500 may receive the reset control signal PCS from the fingerprint sensing driving circuit 700 through the fan-out lines FL. The reset driving circuit 500 may generate reset signals according to the reset control signal PCS and sequentially output the reset signals to the reset lines RST.

The reset driving circuit 500 may be disposed in the non-active region NAR, for example, on any one side of the active region AR. It has been illustrated in FIGS. 4 and 5 that the reset driving circuit 500 is disposed in the non-active region NAR on the right side of the active region AR. Alternatively, or additionally, the reset driving circuit 500 may be disposed in the non-active region NAR on the left side of the active region AR.

Each of the scan driving circuit 400 and the reset driving circuit 500 may include a plurality of thin film transistors. The thin film transistors of each of the scan driving circuit 400 and the reset driving circuit 500 may be formed on substantially the same layer as the thin film transistors of each of the light emitting pixels SP and the light receiving pixels LP, but are limited thereto. In one embodiment, the thin film transistors of each of the scan driving circuit 400 and the reset driving circuit 500 may be formed on a different layer from the thin film transistors of the light emitting pixels SP and the light receiving pixels LP.

Figure 7:
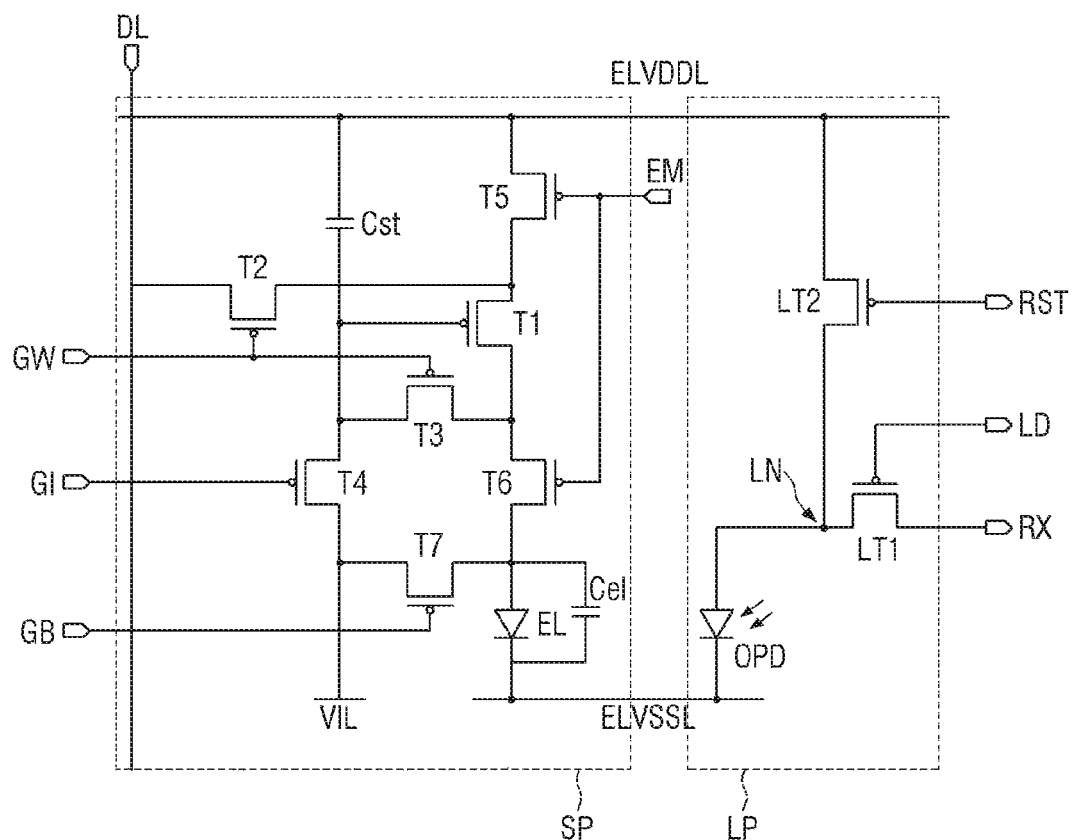
FIG. 7 illustrates an embodiment of a light emitting pixel and a light receiving pixel.

FIG. 7 is a circuit diagram of a light emitting pixel SP and a light receiving pixel LP according to an example embodiment. Each of the light emitting pixels SP may be connected to a first scan line GI, a second scan line GW, a third scan line GB, an emission line EM, and a data line DL. In addition, each of the light emitting pixels SP may be connected to a first driving voltage line ELVDDL to which a first driving voltage ELVDD is supplied, a second driving voltage line ELVSSL to which a second driving voltage ELVSS is supplied, and an initialization voltage line VIL to which an initialization voltage Vint is supplied.

Each of the light receiving pixels LP may be connected to a fingerprint scan line LD, a reset line RST, and a fingerprint sensing line RX. In addition, each of the light receiving pixels LP may be connected to the first driving voltage line ELVDDL and the second driving voltage line ELVSSL.

Each of the light emitting pixels SP may include first to seventh transistors T1, T2, T3, T4, T5, T6, and T7, a light emitting element EL, and at least one capacitor. Among the first to seventh transistors T1, T2, T3, T4, T5, T6, and T7, the first transistor T1 may be a driving transistor. The second to seventh transistors T2 to T7 may serve as switch elements that are turned on or off according to scan signals applied to their gate electrodes.

The first transistor T1 may include a gate electrode, a first electrode, and a second electrode. The gate electrode may be disposed above an active layer of the first transistor T1. The first transistor T1 may control a source-drain current Isd (hereinafter, referred to as "driving current Isd") according to a data voltage applied to the gate electrode. The driving current Isd flowing through a channel of the first transistor T1 is proportional to the square of a difference between a voltage between a source electrode and the gate electrode of the first transistor T1 and an absolute value of a threshold voltage (Vth) as represented in Equation 1.

$$Isd = k' \times (Vsg - |Vth|)^2 \qquad (1)$$

In Equation 1, k' refers to a proportional coefficient determined by a structure and physical properties of the first transistor T1, Vsg refers to the source-gate voltage of the first transistor T1, and Vth refers to the threshold voltage of the first transistor T1.

The light emitting element EL may emit light by the driving current Isd. The amount of light emitted from the light emitting element EL may be proportional to a magnitude of the driving current Ids. The light emitting element EL may be an organic light emitting diode including an anode electrode, a cathode electrode, and an organic light emitting layer disposed between the anode electrode and the cathode electrode. Alternatively, the light emitting element EL may be an inorganic light emitting diode including an anode electrode, a cathode electrode, and an inorganic light emitting layer disposed between the anode electrode and the cathode electrode, or may be a quantum dot light emitting element EL including an anode electrode, a cathode electrode, and a quantum dot light emitting layer disposed between the anode electrode and the cathode electrode. In one embodiment, the light emitting element EL may be a micro light emitting diode.

The anode electrode of the light emitting element EL may be connected to a second electrode of the sixth transistor T6 and a second electrode of the seventh transistor T7. The cathode electrode of the light emitting element EL may be connected to the second driving voltage line ELVSSL. A parasitic capacitance Cel may be formed between the anode electrode and the cathode electrode of the light emitting element EL.

The second transistor T2 may be disposed between the data line DL and a first electrode of the first transistor T1. The second transistor T2 may be turned on by a scan signal of the second scan line GW to connect the first electrode of the first transistor T1 and the data line DL to each other. A gate electrode of the second transistor T2 may be connected to the second scan line GW, a first electrode of the second transistor T2 may be connected to the data line DL, and a second electrode of the second transistor T2 may be connected to the first electrode of the first transistor T1.

The third transistor T3 may be disposed between a gate electrode of the first transistor T1 and a second electrode of the first transistor T1. The third transistor T3 may be turned on by the scan signal of the second scan line GW to connect the gate electrode and the second electrode of the first transistor T1 to each other. When the third transistor T3 is turned on, the gate electrode and the second electrode of the first transistor T1 are connected to each other, and thus the first transistor T1 may be driven as a diode. A gate electrode of the third transistor T3 may be connected to the second scan line GW, a first electrode of the third transistor T3 may be connected to the gate electrode of the first transistor T1, and a second electrode of the third transistor T3 may be connected to the second electrode of the first transistor T1.

The fourth transistor T4 may be disposed between the initialization voltage line VIL and the gate electrode of the first transistor T1. The fourth transistor T4 may be turned on by a scan signal of the first scan line GI to connect the gate electrode of the first transistor T1 and the initialization voltage line VIL to each other. In this case, the gate electrode of the first transistor T1 may be discharged to the initialization voltage Vint of the initialization voltage line VIL. A gate electrode of the fourth transistor T4 may be connected to the first scan line GI, a first electrode of the fourth transistor T4 may be connected to the gate electrode of the first transistor T1, and a second electrode of the fourth transistor T4 may be connected to the initialization voltage line VIL.

The fifth transistor T5 may be disposed between the first driving voltage line ELVDDL and the first electrode of the first transistor T1. The fifth transistor T5 may be turned on by an emission signal SEM of the emission line EM to connect the first electrode of the first transistor T1 and the first driving voltage line ELVDDL to each other. A gate electrode of the fifth transistor T5 may be connected to the emission line EM, a first electrode of the fifth transistor T5 may be connected to the first driving voltage line ELVDDL, and a second electrode of the fifth transistor T5 may be connected to the first electrode of the first transistor T1.

The sixth transistor T6 may be disposed between the second electrode of the first transistor T1 and the anode electrode of the light emitting element EL. The sixth transistor T6 may be turned on by the emission signal SEM of the emission line EM to connect the second electrode of the first transistor T1 and the anode electrode of the light emitting element EL to each other. A gate electrode of the sixth transistor T6 may be connected to the emission line EM, a first electrode of the sixth transistor T6 may be connected to the second electrode of the first transistor T1, and the second electrode of the sixth transistor T6 may be connected to the anode electrode of the light emitting element EL.

When both the fifth transistor T5 and the sixth transistor T6 are turned on, the driving current Isd may be supplied to the light emitting element EL.

The seventh transistor T7 may be disposed between the initialization voltage line VIL and the anode electrode of the light emitting element EL. The seventh transistor T7 may be turned on by a scan signal of the third scan line GB to connect the initialization voltage line VIL and the anode electrode of the light emitting element EL to each other. In this case, the anode electrode of the light emitting element EL may be discharged to the initialization voltage Vint. A gate electrode of the seventh transistor T7 may be connected to the third scan line GB, a first electrode of the seventh transistor T7 may be connected to the initialization voltage line VIL, and the second electrode of the seventh transistor T7 may be connected to the anode electrode of the light emitting element EL.

A storage capacitor may be formed between the gate electrode of the first transistor T1 and the first driving voltage line ELVDDL. One electrode of the storage capacitor may be connected to the gate electrode of the first transistor T1, and the other electrode of the storage capacitor may be connected to the first driving voltage line ELVDDL. Therefore, the storage capacitor may maintain a potential difference between the gate electrode of the first transistor T1 and the first driving voltage line ELVDDL.

Each of the light receiving pixels LP may include a sensing transistor LT1, a reset transistor LT2, and a light receiving element OPD. Each of the light receiving pixels LP may further include a sensing node LN between the sensing transistor LT1, the reset transistor LT2, and the light receiving element OPD. The sensing transistor LT1 and the reset transistor LT2 may be transistors serving as switch elements that are turned on or off according to a fingerprint scan signal SLD or a reset signal SRST applied to their gate electrodes.

When a plurality of light receiving elements OPD and a plurality of light emitting elements EL are disposed in one display panel 100, voltage lines or signal lines for driving the light emitting elements EL may be shared in driving the light receiving elements OPD. In this case, the number of voltage lines or signal lines may be reduced or minimized for driving the plurality of light receiving elements OPD disposed in the display panel 100. As a result, the display panel 100 may be easily manufactured and manufacturing costs of the display panel 100 may be decreased.

The light receiving element OPD may generate photocharges when it is exposed to external light. The generated photocharges may be accumulated in an anode electrode of the light receiving element OPD. In this case, a voltage of the sensing node LN electrically connected to the anode electrode may be boosted. When the light receiving element OPD and the fingerprint sensing line RX are connected to each other, a current may flow due to a difference between the voltage of the sensing node LN in which charges are accumulated and a voltage of the fingerprint sensing line RX.

The light receiving element OPD may be an organic photodiode including a first electrode, a second electrode, and a photoelectric conversion layer disposed between the first electrode and the second electrode. The photoelectric conversion layer may include, for example, a donor layer, an acceptor layer, and a donor-acceptor mixed layer. However, the present disclosure is not limited thereto.

A first electrode of the light receiving element OPD may be connected to the sensing node LN, and a second electrode of the light receiving element OPD may be connected to the second driving voltage line ELVSSL. The first electrode of the light receiving element OPD may be an anode electrode, and the second electrode of the light receiving element OPD may be a cathode electrode.

According to an example, the light receiving element OPD may generate photocharges according to an amount of light when it is exposed to external light in a forward bias state of an operating point or more. The light receiving element OPD may not generate photocharges (or may generate a relatively small amount of photocharges that do not exceed a current magnitude for fingerprint sensing), even when it is exposed to external light in a forward bias state that does not exceed the operating point or an inverse bias state. Accordingly, the light receiving element OPD may be placed in the forward bias state of the operating point or more before being put in a light exposure state. For example, the voltage difference between the anode electrode and the cathode electrode of the light receiving element OPD before being put in the light exposure state may correspond to a voltage difference greater than a threshold voltage of the light receiving element OPD.

In order for the light receiving element OPD to operate in the forward bias state of the operating point or more, the second electrode (which is the cathode electrode of the light receiving element OPD) may be connected to the second driving voltage line ELVSSL to which the second driving voltage ELVSS that is relatively stable and is a low voltage is applied, among the voltage lines or the signal lines for driving the light emitting element EL. The second driving voltage ELVSS according to an example may be less than 0 V, but may be a different voltage in another embodiment.

In this case, the difference between a magnitude of a voltage for resetting the sensing node LN and the first electrode of the light receiving element OPD and the second driving voltage ELVSS of the second driving voltage line ELVSSL connected to the second electrode should be equal to or greater than the threshold voltage of the light receiving element OPD.

The magnitude of the voltage applied to the fingerprint sensing line RX may be less than the first driving voltage ELVDD applied to the first driving voltage line ELVDDL or a high voltage applied to the scan line. Since the fingerprint sensing driving circuit 700 generates the fingerprint sensed data according to the current magnitude or the change in the current magnitude of the fingerprint sensing line RX as described above, it may be beneficial in some cases to generate fingerprint sensed data corresponding to each of the ridges and the valleys of the fingerprint where the current magnitude or a change range in the current magnitude lies in a predetermined range, e.g., becomes larger. The current magnitude or the change range in the current magnitude described above may be proportional to the voltage difference between the sensing node LN and the fingerprint sensing line RX. Accordingly, in some cases it may be beneficial in sensing the fingerprint for the magnitude of the voltage applied to the fingerprint sensing line RX to become smaller. As a non-restrictive example, the voltage magnitude of the fingerprint sensing line RX may be approximately 0.5 to 1 V. As a specific example, the voltage magnitude of the fingerprint sensing line RX may be about 0.875 V. The voltage magnitude may be in a different voltage range in another embodiment.

As described above, when the voltage of the fingerprint sensing line RX to which a relatively low voltage is applied is used as the voltage for resetting the sensing node LN and the first electrode of the light receiving element OPD, the voltage difference between the voltage applied to the fingerprint sensing line RX and the second driving voltage ELVSS may not exceed a threshold voltage value of the light receiving element OPD. Accordingly, the first driving voltage ELVDD of the first driving voltage line ELVDDL, which is relatively stable and has a great voltage magnitude, among the voltage lines or the signal lines for driving the light emitting element EL, may be used as a reset voltage. For example, the first driving voltage ELVDD may be approximately 5 V to 10 V, but may be in a different range in another embodiment.

The sensing transistor LT1 may be disposed between the fingerprint sensing line RX and the sensing node LN. The sensing transistor LT1 may be turned on (by a scan signal of the fingerprint scan line LD) to connect the first electrode of the light receiving element OPD and the fingerprint sensing line RX to each other through the sensing node LN. A gate electrode of the sensing transistor LT1 may be connected to the fingerprint scan line LD, a first electrode of the sensing transistor LT1 may be connected to the sensing node LN, and a second electrode of the sensing transistor LT1 may be connected to the fingerprint sensing line RX.

The reset transistor LT2 may be disposed between the first driving voltage line ELVDDL and the sensing node LN. The reset transistor LT2 may be turned on (by the reset signal SRST of the reset line RST) to connect the first electrode of the light receiving element OPD and the first driving voltage line ELVDDL to each other through the sensing node LN. In this case, the sensing node LN and the first electrode of the light receiving element OPD may be reset to the first driving voltage ELVDD. A gate electrode of the reset transistor LT2 may be connected to the reset line RST, a first electrode of the reset transistor LT2 may be connected to the first driving voltage line ELVDDL, and a second electrode of the reset transistor LT2 may be connected to the sensing node LN.

When the first electrode of each of the first to seventh transistors T1, T2, T3, T4, T5, T6, and T7, the sensing transistor LT1, and the reset transistor LT2 is a source electrode, the second electrode of each of the first to seventh transistors T1, T2, T3, T4, T5, T6, and T7, the sensing transistor LT1, and the reset transistor LT2 may be a drain electrode. Alternatively, when the first electrode of each of the first to seventh transistors T1, T2, T3, T4, T5, T6, and T7, the sensing transistor LT1, and the reset transistor LT2 is a drain electrode, the second electrode of each of the first to seventh transistors T1, T2, T3, T4, T5, T6, and T7, the sensing transistor LT1, and the reset transistor LT2 may be a source electrode.

An active layer of each of the first to seventh transistors T1, T2, T3, T4, T5, T6, and T7, the sensing transistor LT1, and the reset transistor LT2 may be formed of any one of polysilicon, amorphous silicon, or an oxide semiconductor.

In one embodiment, all of the first to seventh transistors T1, T2, T3, T4, T5, T6, and T7, the sensing transistor LT1, and the reset transistor LT2 may be P-type transistors. In this case, the active layer of each of the first to seventh transistors T1, T2, T3, T4, T5, T6, and T7, the sensing transistor LT1, and the reset transistor LT2 may be formed of polysilicon. However, example embodiments are not limited thereto. In one embodiment, the third transistor T3 and the fourth transistor T4 of the light emitting pixel SP may be N-type transistors having an active layer formed of an oxide. In addition, at least one of the sensing transistor LT1 or the reset transistor LT2 may be formed as an N-type transistor having an active layer formed of an oxide. When at least one of the first to seventh transistors T1, T2, T3, T4, T5, T6, and T7, the sensing transistor LT1, and the reset transistor LT2 is an N-type transistor, a waveform diagram of FIG. 8 may be modified to be appropriate for characteristics of the N-type transistor. A specific example will be described later.

Figure 8:
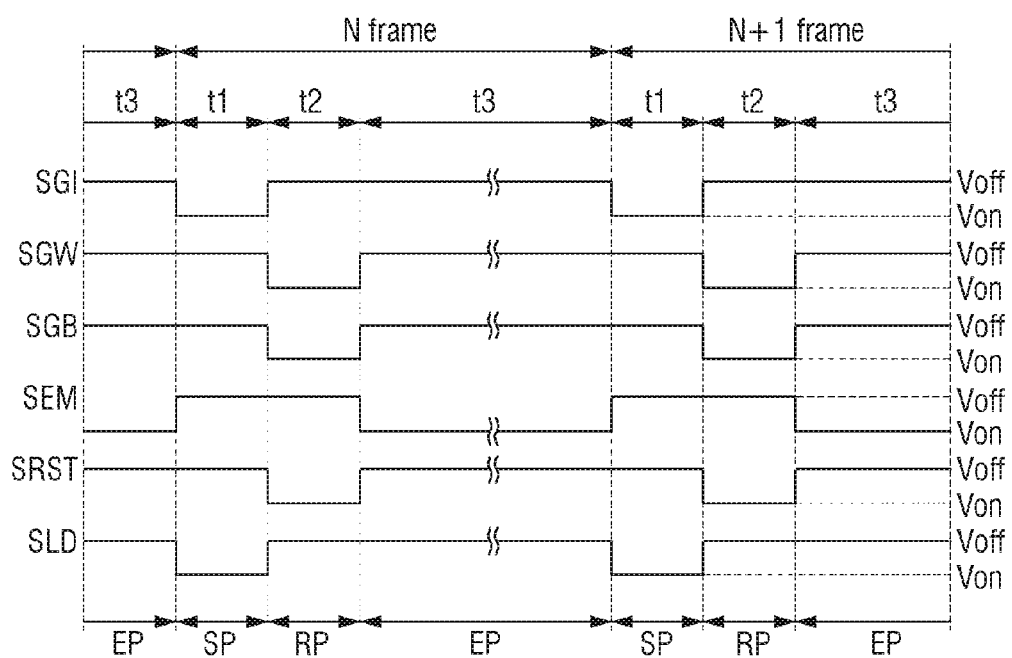
FIG. 8 illustrates an example of signals applied to scan lines, an emission line, a reset line, and a fingerprint scan line.

FIG. 8 is a waveform diagram illustrating an embodiment of signals that may be applied to the first scan line, the second scan line, the third scan line, the emission line, the reset line, and the fingerprint scanning line of FIG. 7.

Referring to FIGS. 7 and 8, a first scan signal SGI is applied to the first scan line GI to control turn-on and turn-off of the fourth transistor T4. A second scan signal SGW is applied to the second scan line GW to control turn-on and turn-off of each of the second transistor T2 and the third transistor T3.

A third scan signal SGB is applied to the third scan line GB to control turn-on and turn-off of the seventh transistor T7. In one embodiment, the third scan signal SGB may be substantially the same as the second scan signal SGW, e.g., the third scan line GB may be substantially the same as the second scan line GW. However, the present disclosure is not limited thereto. In other example embodiments, the third scan signal SGB may be substantially the same as the first scan signal SGI, and in some example embodiments, the third scan signal SGB may be a separate signal different from the first scan signal SGI and the second scan signal SGW. Hereinafter, it will be described that the third scan signal SGB is substantially the same as the second scan signal SGW.

The emission signal SEM is applied to the emission line EM to control turn-on and turn-off of each of the fifth transistor T5 and the sixth transistor T6.

The reset signal SRST is applied to the reset line RST to control turn-on and turn-off of the reset transistor LT2. In one embodiment, the reset signal SRST may be a separate signal different from the first scan signal SGI and the second scan signal SGW. As described above, the reset signal SRST of the light receiving element OPD may not be shared with the first scan signal SGI or the second scan signal SGW of the light emitting pixel SP and is separated from the first scan signal SGI or the second scan signal SGW of the light emitting pixel SP. Thus, a reset timing and the number of times of reset of the light receiving element OPD may be independently adjusted. A detailed description therefor will be provided later.

The fingerprint scan signal SLD is applied to the fingerprint scan line LD to control turn-on and turn-off of the sensing transistor LT1. In one embodiment, the fingerprint scan signal SLD may be substantially the same as the first scan signal SGI, e.g., the fingerprint scan line LD may be substantially the same as the first scan line GI. However, example embodiments are not limited thereto. For example, the fingerprint scan signal SLD may be substantially the same as the second scan signal SGW. However, in this case, a period in which the second scan signal SGW has a gate-on voltage Von may precede a period in which the reset signal SRST has a gate-on voltage. When the fingerprint scan signal SLD is shared with one of the scan signals of the light emitting pixel SP as described above, a separate driver for generating and outputting the fingerprint scan signal SLD may not be used. As a result, manufacturing costs of the display panel 100 may be decreased and the size of the bezel region of the display device may be reduced. Hereinafter, it will be described that the fingerprint scan signal SLD is substantially the same as the first scan signal SGI.

The first scan signal SGI, the second scan signal SGW, the emission signal SEM, and the reset signal SRST may have signals repeated at a cycle of one frame period. However, the present disclosure is not limited thereto.

One frame period according to an example may be divided into a first period t1, a second period t2, and a third period t3. In the first period t1, the initialization voltage Vint is applied to the gate electrode of the first transistor T1 to initialize a voltage of the gate electrode of the first transistor T1 to the initialization voltage Vint. In the second period t2, a data voltage is supplied to the first electrode of the first transistor T1 and a threshold voltage of the first transistor T1 is sampled. In the third period t3, the data voltage is supplied to the first electrode of the first transistor and the threshold voltage of the first transistor T1 is sampled, according to an operation of the light emitting pixel SP.

The second period t2 may include a period in which the initialization voltage Vint is applied to the anode electrode of the light emitting element EL, to initialize a voltage of the anode electrode of the light emitting element EL to the initialization voltage Vint.

In one embodiment, one frame period may be divided into a fingerprint sensing period SP, a reset period RP, and a light exposure period EP. In the fingerprint sensing period SP, the first electrode of the light receiving element OPD and the fingerprint sensing line RX are connected to each other and the fingerprint is sensed based on the magnitude of a current flowing between the first electrode and the fingerprint sensing line RX. In the reset period RP, the first driving voltage ELVDD is applied to the first electrode of the light receiving element OPD to reset the first electrode of the light receiving element OPD to the first driving voltage ELVDD. In the light exposure period EP, the light receiving element OPD is exposed to external light and photocharges are generated according to an intensity of the external light. Accordingly, a voltage of the first electrode of the light receiving element OPD and a voltage of the sensing node LN rise, according to an operation of the light receiving pixel LP.

The first scan signal SGI may have a gate-on voltage Von during the first period t1 and may have a gate-off voltage Voff during the other periods. The second scan signal SGW may have a gate-on voltage Von during the second period t2 and may have a gate-off voltage Voff during the other periods. The emission signal SEM may have a gate-on voltage Von during the third period t3 and may have a gate-off voltage Voff during the other periods.

It has been illustrated in FIG. 6 that a period in which the first scan signal SGI has the gate-on voltage Von is substantially the same as the first period t1, and a period in which the second scan signal SGW has the gate-on voltage Von is substantially the same as the second period t2. In one embodiment, the period in which the first scan signal SGI has the gate-on voltage Von may be shorter than the first period t1, and/or the period in which the second scan signal SGW has the gate-on voltage Von may be shorter than the second period t2.

It has been illustrated in FIG. 8 that the fingerprint sensing period SP corresponds to the first period t1, the reset period RP corresponds to the second period t2, and the light exposure period EP corresponds to the third period t3, which is a period in which the light emitting element EL of the light emitting pixel SP emits light. But, the fingerprint sensing period SP, the reset period RP, and/or the light exposure period EP may correspond to different periods in another embodiment.

Figure 9:
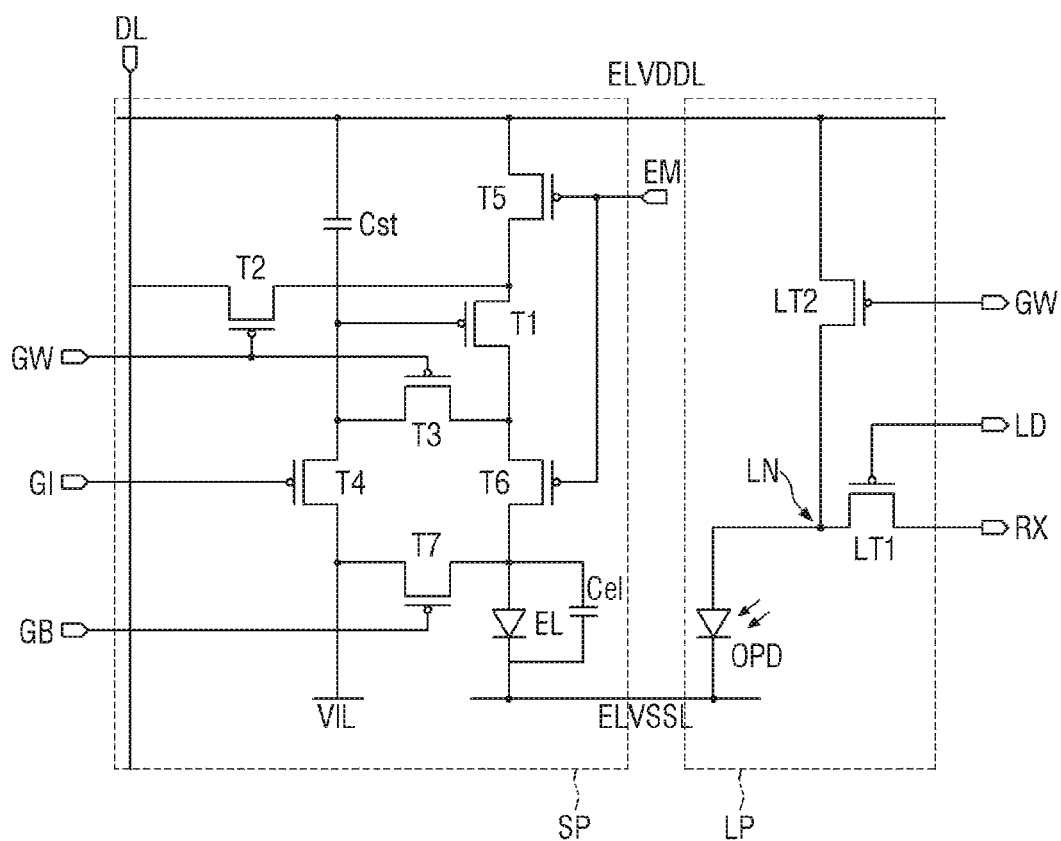
FIG. 9 illustrates an embodiment of a light emitting pixel and a light receiving pixel.

FIG. 9 is a circuit diagram of a light emitting pixel and a light receiving pixel according to an example embodiment. The embodiment of FIG. 9 is different from the embodiment of FIG. 7 in that the light receiving pixel LP shares the second scan signal SGW of the second scan line GW of the light emitting pixel SP as a signal for controlling the reset transistor LT2.

According to such a structure, a separate control line and control driver for controlling the reset transistor LT2 of the light receiving pixel LP may not be used and the first driving voltage ELVDD may be used to reset the light receiving element OPD. Thus, the width of the bezel region of the display device and an interval between the light emitting pixel SP and the light receiving pixel LP may be decreased. Also, this may allow the light receiving element OPD to smoothly operate in the forward bias state.

Figure 10:
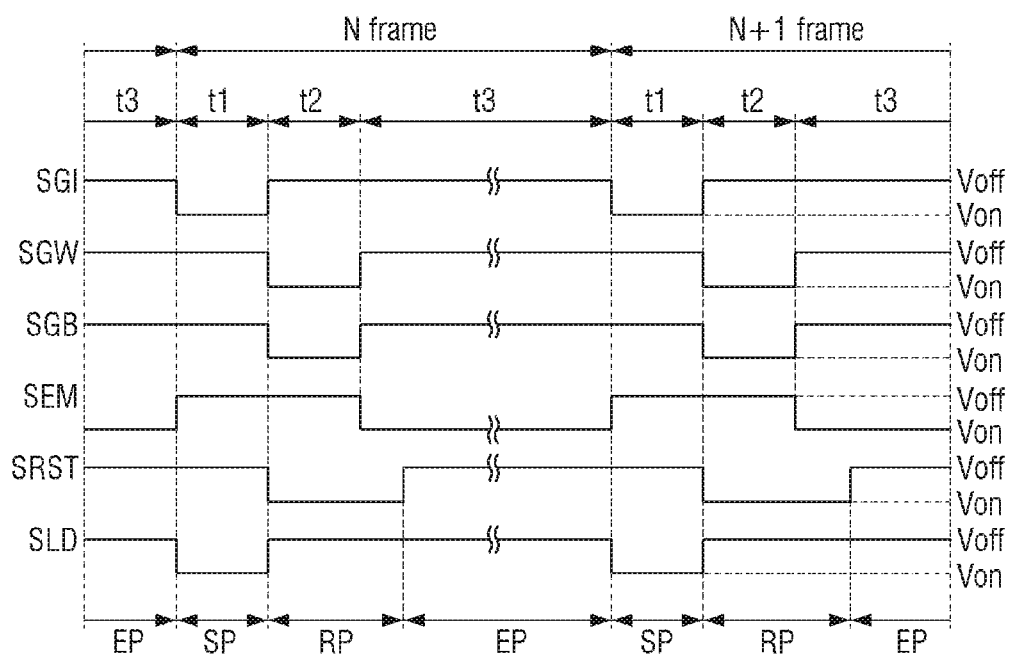
FIG. 10 illustrates an embodiment of a signal applied to a reset line.

FIG. 10 is a waveform diagram illustrating an embodiment of a signal applied to a reset line of FIG. 7. Referring to FIGS. 7 and 10, the reset signal SRST applied to the reset line RST may have a turn-on voltage for a period longer than the second period t2. For example, the reset signal SRST may have a turn-on voltage during a period completely overlapping the second period t2 and overlapping at least a portion of the third period t3. In this case, the reset transistor LT2 connected to the reset line RST may maintain the turn-on state for a period longer than that in FIG. 8. In some cases, this may be beneficial in initializing a voltage of the sensing node LN and the first electrode of the light receiving element OPD to the first driving voltage ELVDD.

In addition, when the reset period RP overlaps at least a portion of the third period t3, the voltage of the sensing node LN and the first electrode of the light receiving element OPD may be maintained as the first driving voltage ELVDD until light emitted from the light emitting element EL reaches the light receiving element OPD. This may allow the light receiving element OPD to smoothly operate in the forward bias state.

It has been illustrated in FIG. 10 that the reset signal SRST has a turn-on voltage at substantially the same time as the second scan signal SGW, but the present disclosure is not limited thereto. In one embodiment, the reset signal SRST may have a turn-on voltage later than the second scan signal SGW.

Figure 11:
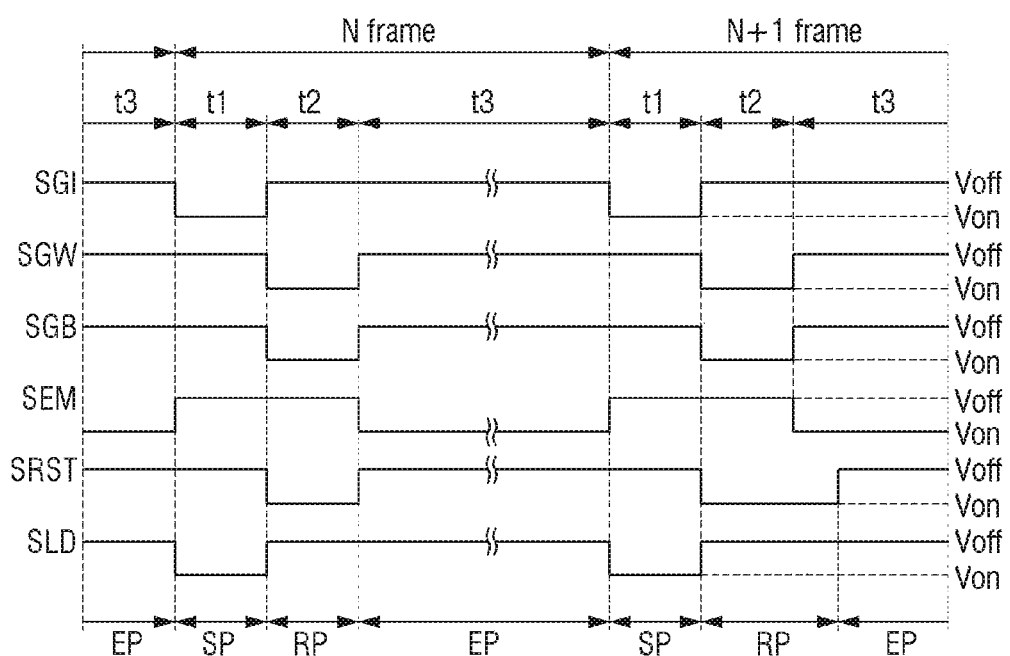
FIG. 11 illustrates an embodiment of a signal applied to a reset line.
Figure 12:
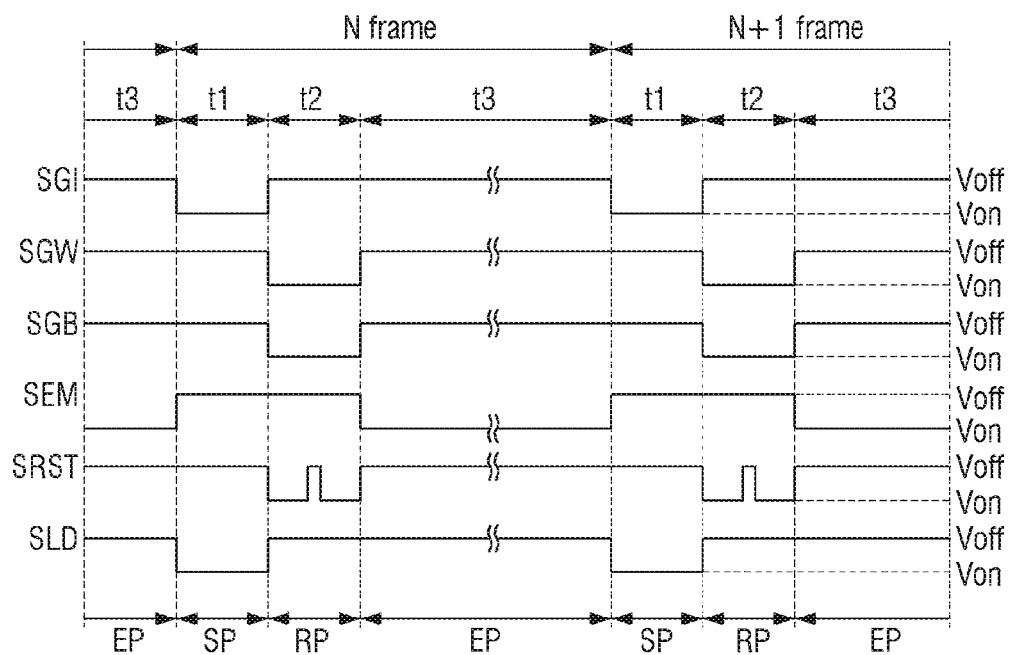
FIG. 12 illustrates an embodiment of a signal applied to a reset line.

FIG. 11 is a waveform diagram illustrating another embodiment of a signal applied to a reset line of FIG. 7. FIG. 12 is a waveform diagram illustrating another embodiment of a signal applied to a reset line of FIG. 7.

Referring to FIGS. 7 and 11, the reset signal SRST applied to the reset line RST may be controlled independently of the scan signals SGI, SGW, and SGB as described above. Thus, the reset period RP may be different for each frame. For example, when it is determined that a first electrode of the light receiving pixel LP and the sensing node LN have not been normally reset to the first driving voltage ELVDD (even though the reset signal SRST has a turn-on voltage during substantially the same period as the second period t2 in an N-th frame), a reset period RP in an N+1-th frame may be made to be longer than the reset period in the previous frame, to allow the first electrode of the light receiving pixel LP and the sensing node LN to be normally reset to the first driving voltage ELVDD.

In addition, the reset signal SRST may include a plurality of sub-reset periods during the reset period RP as illustrated in FIG. 12. For example, the reset signal SRST may have a plurality of first sub-reset periods having a turn-on voltage and at least one second sub-reset period having a turn-off voltage during the reset period. The first sub-reset periods and the second sub-reset period may be alternately repeated during the reset period RP.

In this case, a voltage of the first electrode of the light receiving pixel LP and the sensing node LN may be initialized several times to the first driving voltage ELVDD during the reset period RP. This may allow the light receiving element OPD to be in the forward bias state of the operating point or more by the first driving voltage ELVDD before the light exposure period EP.

Hereinafter, a method of driving the light emitting pixel SP and the light receiving pixel LP during one frame period will be described in detail. For convenience of explanation, processes of driving the light emitting pixel SP and the light receiving pixel LP according to the scan signals and the emission signal of FIG. 8 will be described, but the reset signal SRST is independently controlled as described above. Thus, the length of the reset period RP or the number of times of application of the first driving voltage ELVDD to the sensing node LN and the first electrode of the light receiving element OPD during the reset period RP may be variously modified.

In the light emitting pixel SP, during the first period t1, the first scan signal SGI having the gate-on voltage Von is supplied to the first scan line GI. During the first period t1, the fourth transistor T4 is turned on by the first scan signal SGI. Due to the turn-on of the fourth transistor T4, a voltage of the gate electrode of the first transistor T1 is initialized to the initialization voltage Vint of the initialization voltage line VIL.

Then, during the second period t2, the second scan signal SGW having the gate-on voltage Von is supplied to the second scan line GW. Therefore, each of the second transistor T2 and the third transistor T3 connected to the second scan line GW is turned on. As a result, a data voltage Vdata is supplied to the first electrode of the first transistor T1, the gate electrode and the second electrode of the first transistor T1 are connected to each other, and the first transistor T1 is driven as the diode.

In this case, a voltage (Vsg=Vdata−Vint) between the first electrode and the gate electrode of the first transistor T1 is less than the absolute value of the threshold voltage Vth. Thus, a current path is formed until the voltage Vsg between the gate electrode and the source electrode of the first transistor T1 reaches the absolute value of the threshold voltage Vth. Therefore, a voltage of the gate electrode and the second electrode of the first transistor T1 rises to a difference voltage (Vdata−|Vth|) between the data voltage and the absolute value of the threshold voltage of the first transistor T1 during the second period t2. In this case, "Vdata−|Vth|" may be stored in the storage capacitor.

Since the first transistor T1 is formed as the P-type transistor, the driving current Isd of the first transistor T1 may be proportional to a voltage Vsd between the source electrode and the drain electrode of the first transistor T1, in a section in which the voltage Vsd between the source electrode and the drain electrode of the first transistor T1 is greater than 0 V. In addition, the threshold voltage Vth of the first transistor T1 may be less than 0 V.

Since the third scan signal SGB having the gate-on voltage Von is supplied to the third scan line GB during the second period t2, the seventh transistor T7 connected to the third scan line GB is turned on. Accordingly, a voltage of the anode electrode of the light emitting element EL is initialized to the initialization voltage Vint of the initialization voltage line VIL.

Thereafter, the emission signal SEM having the gate-on voltage Von is supplied to the emission line EM during the third period t3. During the third period t3, as illustrated in FIG. 9, each of the fifth transistor T5 and the sixth transistor T6 is turned on by the emission signal SEM. The first electrode of the first transistor T1 is connected to the first driving voltage line ELVDDL due to the turn-on of the fifth transistor T5, and the second electrode of the first transistor T1 is connected to the anode electrode of the light emitting element EL due to the turn-on of the sixth transistor T6.

When the fifth transistor T5 and the sixth transistor T6 are turned on, the driving current Isd flowing according to the voltage of the gate electrode of the first transistor T1 may be supplied to the light emitting element EL. The driving current Isd may be represented in Equation 2.

$$Isd = K' \times (ELVDD - (Vdata - |Vth|) - |Vth|)^2 \quad (2)$$

In Equation 2, k' refers to a proportional coefficient determined by a structure and physical properties of the first transistor T1, Vth refers to the threshold voltage of the first transistor T1, ELVDD refers to the first driving voltage ELVDD of the first driving voltage line ELVDDL, and "Vdata" refers to the data voltage. The gate voltage of the first transistor T1 is "Vdata−|Vth|", and the voltage of the first electrode is "ELVDD". When Equation 2 is rearranged, it may be expressed as Equation 3.

$$Isd = K' \times (ELVDD - (Vdata)^2 \quad (3)$$

As a result, as represented in Equation 3, the driving current Isd does not depend on the threshold voltage Vth of the first transistor T1. That is, the threshold voltage Vth of the first transistor T1 (which is the driving transistor) may be compensated, and the light emitting element EL may emit light according to the magnitude of the driving current Isd adjusted by the first driving voltage ELVDD and the data voltage.

The light receiving element OPD of the light receiving pixel LP may be exposed to external light during the third period t3, in which the light emitting element EL of the light emitting pixel SP emits the light. When the light receiving element OPD is exposed to the external light (which is the light emitted from the light emitting element EL and then reflected from a ridge or valley of the fingerprint) in the light exposure period EP of the previous frame, the light receiving element OPD may generate photocharges according to an amount of light. Also, the magnitude of the voltage of the first electrode of the light receiving element OPD and the sensing node LN may increase in proportion to the amount of light. However, when the reset period RP of the previous frame overlaps at least a portion of the third period t3 as described above, the light exposure period EP (in which the light receiving element OPD generates the photocharges according to the amount of light) may be shorter than the third period t3.

Thereafter, the first scan signal SGI having the gate-on voltage Von is also supplied to the fingerprint scan line LD during the fingerprint sensing period SP. Accordingly, the sensing transistor LT1 is turned on by the first scan signal SGI, and the sensing node LN and the fingerprint sensing line RX are connected to each other. When the sensing node LN and the fingerprint sensing line RX are connected to each other, a current flowing from the sensing node LN to the fingerprint sensing line RX may be generated based on the difference between the voltage of the sensing node LN and the voltage of the fingerprint sensing line RX. The fingerprint sensing driving circuit 700 may generate fingerprint sensed data according to the magnitude of current flowing to the fingerprint sensing line RX and may transmit the fingerprinted sensed data to the processor, e.g., a main processor or other processing logic.

In addition, the voltage of the sensing node LN may be lowered during the fingerprint sensing period SP. At a point in time when the sensing transistor LT1 is turned on, the voltage of the sensing node LN may be greater than the voltage of the fingerprint sensing line RX. However, the current flows from the sensing node LN to the fingerprint sensing line RX during the fingerprint sensing period SP, such that the voltage of the sensing node LN may be lowered. For example, at a point in time when the sensing transistor LT1 is turned off, the voltage of the sensing node LN may be substantially the same as the voltage of the fingerprint sensing line RX. However, example embodiments are not limited thereto. For example, in some cases, the voltage of the sensing node LN may also be higher than the voltage of the fingerprint sensing line RX and lower than the voltage of the first driving voltage ELVDD or higher than the voltage of the first driving voltage ELVDD.

Accordingly, the fingerprint sensing period SP may be defined as a preceding reset period RP in which the voltage of the sensing node LN and the first electrode of the light receiving pixel LP is reset to a voltage of the sensing electrode.

Then, during the reset period RP, the reset signal SRST having the gate-on voltage Von is supplied to the reset line RST, such that the reset transistor LT2 is turned on, and the voltage of the sensing node LN and the first electrode of the light receiving element OPD is reset to the first driving voltage ELVDD.

A voltage fluctuation of the sensing node LN of each light receiving pixel LP during the preceding reset period RP may vary depending on a voltage magnitude of the sensing node LN boosted during the light exposure period EP, or the like. Therefore, the first driving voltage ELVDD that is stable and is higher than voltages of other voltage lines may be used. In some cases, this may be beneficial in setting a state of the light receiving element OPD to the forward bias state of the operating point or more before the light exposure period EP.

Figure 13:
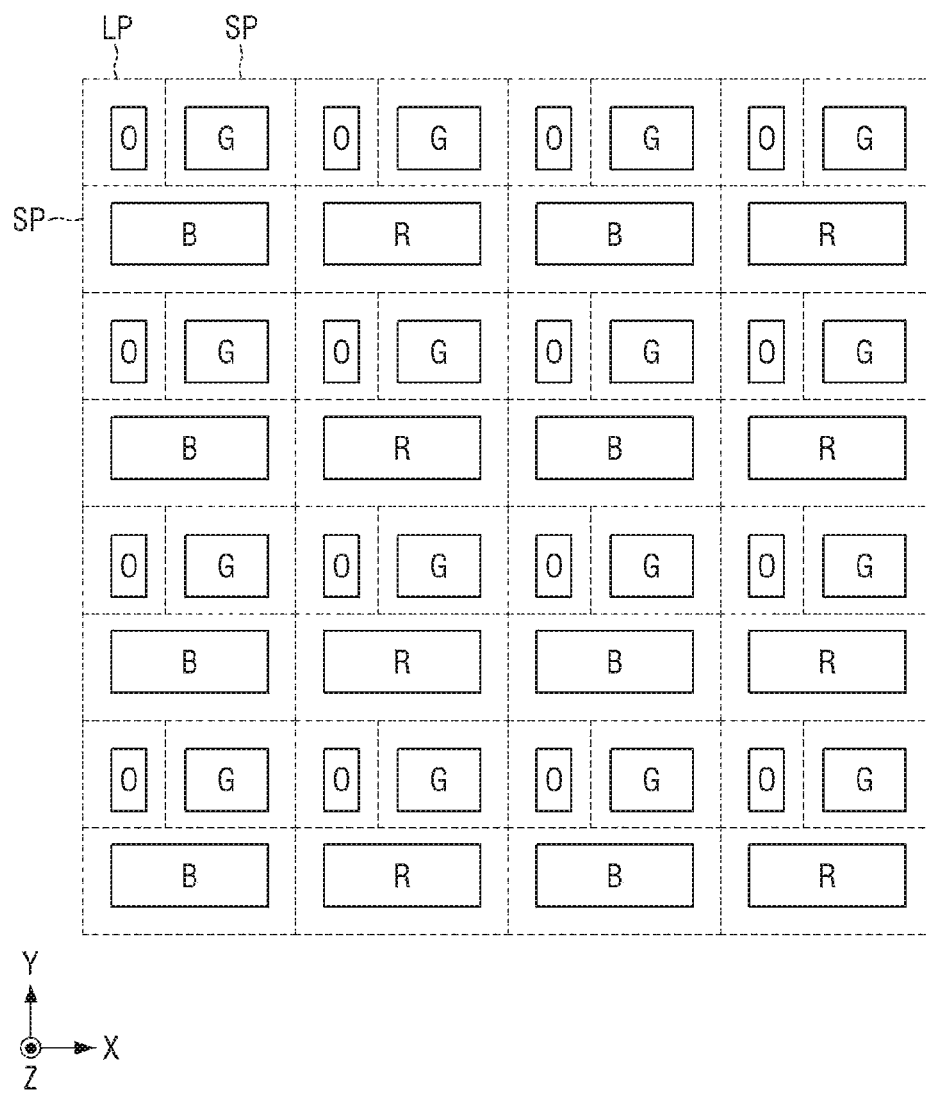
FIG. 13 illustrates an embodiment of light emitting pixels and light receiving pixels in a fingerprint sensing region.

FIG. 13 is a plan view illustrating an arrangement structure, in plan view, of a plurality of light emitting pixels and a plurality of light receiving pixels according to another example embodiment.

Referring to FIG. 13, an area of a light emitting pixel SP including a light emitting element EL of a second color (e.g., green G) of first to third colors R, G, and B of the display panel 100 may be smaller than an area of a light emitting pixel SP including a light emitting element EL of the first color (e.g., red R) and an area of a light emitting pixel SP including a light emitting element EL of the third color (e.g., blue B).

Accordingly, in disposing the plurality of light receiving pixels LP in the fingerprint sensing region FSA, the light receiving pixels LP may be disposed between the light emitting pixels SP including the light emitting elements EL of the second color G. For example, the light emitting pixels SP including the light emitting elements EL of the second color G and the light receiving pixels LP may be sequentially and alternately disposed in odd-numbered rows in the first direction X. The light emitting pixels SP including the light emitting elements EL of the first color R and the light emitting pixels SP including the light emitting elements EL of the third color B may be sequentially and alternately disposed in even-numbered rows in the first direction X.

The sum of a width, in the first direction X, of the light emitting pixel SP including the light emitting element EL of the second color G and a width of the light receiving pixel LP in the first direction X may be substantially the same as a width, in the first direction X, of the light emitting pixel SP including the light emitting element EL of the first color R and a width, in the first direction X, of the light emitting pixel SP including the light emitting element EL of the third color B. Thus, the ratio between the light emitting pixels SP and the light receiving pixels LP disposed in the fingerprint sensing region FSA may be 2:1. In some cases, such a structure may improve resolution of the fingerprint sensing region FSA.

Also in this case, a width by which the light receiving pixels LP are spaced apart from each other may be greater than approximately 30 μm and smaller than 100 μm. This may increase the accuracy of recognition of the user's fingerprint in consideration of a width by which the ridge and the valley of the finger are spaced apart from each other. In one embodiment, each of a width by which the light receiving element OPD and the light emitting element EL are spaced apart from each other in the first direction X and a width by which the light receiving element OPD and the light emitting element EL are spaced apart from each other in the second direction Y may be greater than approximately 16 μm and smaller than 50 μm. The spacing distance may be different in another embodiment.

Figure 14:
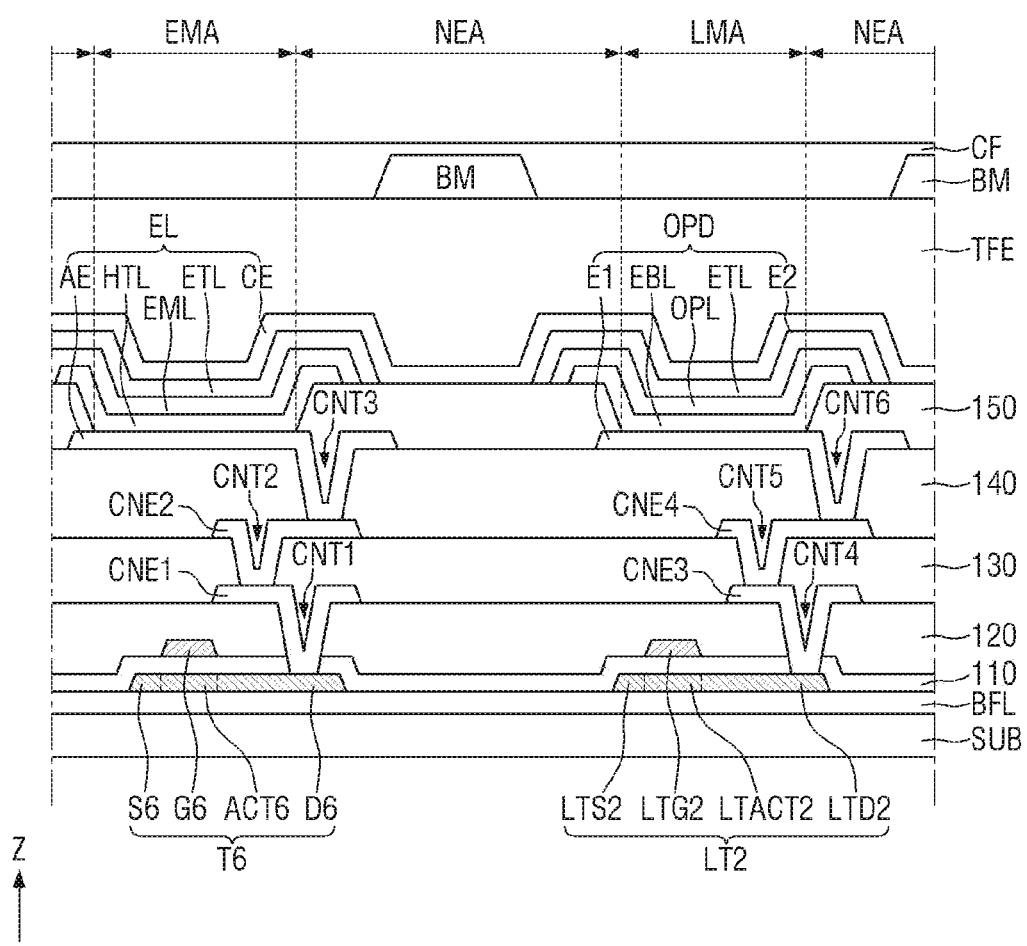
FIG. 14 illustrates an embodiment of a stacked structure of a light emitting element and a light receiving element in a fingerprint sensing region.
Figure 15:
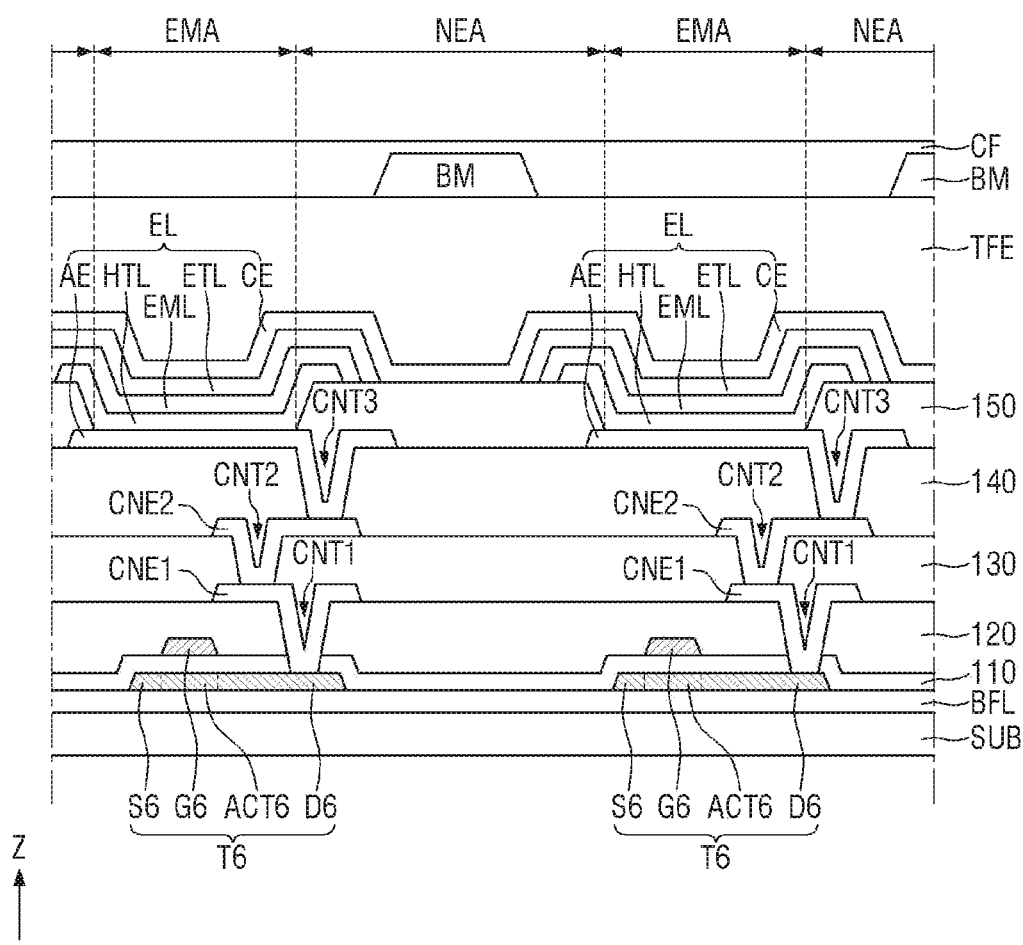
FIG. 15 illustrates an embodiment of a stacked structure of a light emitting element in an active region other than the fingerprint sensing region.

FIG. 14 is a cross-sectional view illustrating a stacked structure of a light emitting element and a light receiving element in the fingerprint sensing region according to an example embodiment. FIG. 15 is a cross-sectional view illustrating a stacked structure of a light emitting element in an active region other than the fingerprint sensing region according to an example embodiment. In FIGS. 14 and 15, for convenience of explanation, only the light emitting element EL, the sixth transistor T6 connected to the anode electrode of the light emitting element EL, the light receiving element OPD, and the reset transistor LT2 connected to the first electrode of the light receiving element OPD are illustrated.

Referring to FIGS. 14 and 15, the width by which the light emitting elements EL are spaced apart from each other in the active region AR that does not overlap the fingerprint sensing region FSA may be smaller than the width by which the light emitting elements EL are spaced space apart from each other in the fingerprint sensing region FSA. According to such a structure, it is possible to prevent resolution of the active region AR that does not overlap the fingerprint sensing region FSA from being lowered.

The display panel 100 includes a substrate SUB, a thin film transistor layer, a light emitting element EL layer, a light receiving element OPD layer, and an encapsulation layer TFE. The thin film transistor layer may include the sixth transistor T6 and the reset transistor LT2 formed as thin film transistors, first to fourth connection electrodes CNE1 to CNE4, a buffer film BFL, a gate insulating film 110, an interlayer insulating film 120, a first planarization film 130 and a second planarization film 140.

The substrate SUB may be made of an insulating material such as glass or a polymer resin. The substrate SUB may be a flexible substrate SUB that may be bent, folded, or rolled. A material constituting the flexible substrate SUB may be, for example, polyimide (PI), but is not limited thereto.

The barrier (or buffer) film BFL may be disposed on the substrate SUB. The buffer film BFL may protect the transistors of the thin film transistor layer, a light emitting layer EML of the light emitting element EL layer, and a photoelectric conversion layer OPL of the light receiving element OPD from moisture permeating through the substrate SUB vulnerable to moisture permeation. For example, the buffer film BFL may be formed as an inorganic film such as a silicon nitride layer, a silicon oxynitride layer, a silicon oxide layer, a titanium oxide layer, or an aluminum oxide layer. In one embodiment, the buffer film BFL may also be omitted.

The sixth transistor T6 and the reset transistor LT2 may be disposed on the buffer film BFL. The sixth transistor T6 and the reset transistor LT2 include active layers ACT6 and LTACT2, gate electrodes G6 and LTG2, source electrodes S6 and LTS2, and drain electrodes D6 and LTD2, respectively. The active layer ACT6, the source electrode S6, and the drain electrode D6 of the sixth transistor T6, and the active layer LTACT2, the source electrode LTS2, and the drain electrode LTD2 of the reset transistor LT2 may be disposed on the buffer film BFL. The active layer of each transistor may include polycrystalline silicon, single crystal silicon, low-temperature polycrystalline silicon, amorphous silicon, or an oxide semiconductor. The active layer overlapping the gate electrode in the third direction Z, which is a thickness direction of the substrate SUB, may be defined as a channel region. The source electrode and the drain electrode of the thin film transistor are regions that do not overlap the gate electrode in the third direction Z, and may have conductivity by doping a silicon semiconductor or an oxide semiconductor with ions or impurities.

The gate insulating film 110 may be disposed on the active layer, the source electrode, and the drain electrode of each transistor. The gate insulating film 110 may be formed as an inorganic film, for example, a silicon nitride layer, a silicon oxynitride layer, a silicon oxide layer, a titanium oxide layer, or an aluminum oxide layer.

The gate electrode of each transistor may be disposed on the gate insulating film 110. The gate electrode may overlap the active layer in the third direction Z. For example, the gate electrode G6 of the sixth transistor T6 may overlap the active layer ACT6 of the sixth transistor T6, and the gate electrode LTG2 of the reset transistor LT2 may overlap the active layer LTACT2 of the reset transistor LT2. The gate electrode may be formed as a single layer or multiple layers made of molybdenum (Mo), aluminum (Al), chromium (Cr), gold (Au), titanium (Ti), neodymium (Nd), or copper (Cu), or alloys thereof.

The interlayer insulating film 120 may be disposed on the gate electrode and may be formed as an inorganic film, for example, a silicon nitride layer, a silicon oxynitride layer, a silicon oxide layer, a titanium oxide layer, or an aluminum oxide layer.

The first connection electrode CNE1 and the third connection electrode CNE3 may be disposed on the interlayer insulating film 120. The first connection electrode CNE1 may be connected to the drain electrode D6 of the sixth transistor T6 through a first contact hole CNT1 penetrating through the gate insulating film 110 and the interlayer insulating film 120. The third connection electrode CNE3 may be connected to the drain electrode LTG2 of the reset transistor LT2 through a fourth contact hole CNT4 penetrating through the gate insulating film 110 and the interlayer insulating film 120. Each of the first connection electrode CNE1 and the third connection electrode CNE3 may be formed as a single layer or multiple layers made of molybdenum (Mo), aluminum (Al), chromium (Cr), gold (Au), titanium (Ti), neodymium (Nd), or copper (Cu), or alloys thereof.

The first planarization film 130 for planarizing a step caused by the transistors may be disposed on the first connection electrode CNE1 and the third connection electrode CNE3. The first planarization film 130 may be formed as an organic film made of an acryl resin, an epoxy resin, a phenolic resin, a polyamide resin, a polyimide resin, or another material.

The second connection electrode CNE2 and the fourth connection electrode CNE4 may be disposed on the first planarization film 130. The second connection electrode CNE2 may be connected to the first connection electrode CNE1 through a second contact hole CNT2 penetrating through the first planarization film 130. The fourth connection electrode CNE4 may be connected to the third connection electrode CNE3 through a fifth contact hole CNT5 penetrating through the first planarization film 130. Each of the second connection electrode CNE2 and the fourth connection electrode CNE4 may be formed as a single layer or multiple layers made of molybdenum (Mo), aluminum (Al), chromium (Cr), gold (Au), titanium (Ti), neodymium (Nd), or copper (Cu), or alloys thereof.

The second planarization film 140 may be disposed on the second connection electrode CNE2 and the fourth connection electrode CNE4. The second planarization film 140 may be formed as an organic film made of an acryl resin, an epoxy resin, a phenolic resin, a polyamide resin, a polyimide resin, or another material.

The light emitting element EL, the light receiving element OPD, and a pixel defining film 150 may be disposed on the second planarization film 140. The light emitting element EL may include a pixel electrode AE, a hole transport layer HTL, a light emitting layer EML, an electron transport layer ETL, and a common electrode CE, and the light receiving element OPD may include a first electrode E1, an electron blocking layer EBL, a photoelectric conversion layer OPL, an electron transport layer ETL, and a second electrode E2.

The pixel electrode AE of the light emitting element EL may be disposed on the second planarization film 140 and may be connected to the second connection electrode CNE2 through a third contact hole CNT3 penetrating through the second planarization film 140.

In a top-emission structure in which light is emitted toward the common electrode CE based on the light emitting layer EML, the pixel electrode AE may be formed of a metal material having high reflectivity. Examples include a stacked structure (Ti/Al/Ti) of aluminum and titanium, a stacked structure (ITO/Al/ITO) of aluminum and indium tin oxide (ITO), an APC alloy, and a stacked structure (ITO/APC/ITO) of an APC alloy and ITO. The APC alloy is an alloy of silver (Ag), palladium (Pd), and copper (Cu).

The first electrode E1 of the light receiving element OPD may be disposed on the second planarization film 140. The first electrode E1 may be connected to the fourth connection electrode CNE4 through a sixth contact hole CNT6 penetrating through the second planarization film 140.

The first electrode E1 of the light receiving element OPD may be formed, for example, as a single layer made of molybdenum (Mo), titanium (Ti), copper (Cu), or aluminum (Al) or may be formed as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO.

The pixel defining film 150 may be formed to partition the pixel electrode AE of the light emitting element EL and the first electrode E1 of the light receiving element OPD on the second planarization film 140 to define a light emitting region EMA and a light receiving region LMA. The pixel defining film 150 may be disposed to cover an edge of each of the pixel electrode AE of the light emitting element EL and the first electrode E1 of the light receiving element OPD. The pixel defining film 150 may be formed as an organic film made of an acryl resin, an epoxy resin, a phenolic resin, a polyamide resin, a polyimide resin, or another material.

The hole transport layer HTL, the light emitting layer EML, the electron transport layer ETL, and the common electrode CE may be sequentially disposed on the pixel electrode AE of the light emitting element EL. The light emitting element EL may further include a hole injection layer disposed between the hole transport layer HTL and the light emitting layer EML and an electron injection layer disposed between the electron transport layer ETL and the light emitting layer EML. The light emitting element EL may emit light by a combination between holes from the pixel electrode AE and electrons from the common electrode CE in the light emitting layer EML. The light emitting layer EML according to an example may include an organic material.

In the top-emission structure, the common electrode CE may be formed of a transparent conductive material (TCO), e.g., ITO or indium zinc oxide (IZO) capable of transmitting light therethrough or a semi-transmissive conductive material such as magnesium (Mg), silver (Ag), or an alloy of magnesium (Mg) and silver (Ag). When the common electrode CE is formed of the semi-transmissive conductive material, emission efficiency may be increased by a micro cavity.

A hole transport layer HTL, the photoelectric conversion layer OPL, and the second electrode E2 may be sequentially disposed on the first electrode E1 of the light receiving element OPD. The light receiving element OPD may further include an electron blocking layer and/or a hole injection layer between the hole transport layer HTL and the photoelectric conversion layer OPL or further include an electron injection layer between the electron transport layer ETL and the photoelectric conversion layer OPL.

The second electrode E2 of the light receiving element OPD may be substantially the same as the common electrode CE of the light emitting element EL. For example, the common electrode CE of the light emitting element EL may be disposed across the light emitting layer EML of the light emitting element EL, the pixel defining film 150, and the photoelectric conversion layer OPL of the light receiving element OPD.

The photoelectric conversion layer OPL of the light receiving element OPD may generate photocharges according to an amount of light when it is exposed to external light. The photoelectric conversion layer may include a donor layer, an acceptor layer, and a donor-acceptor mixed layer. In one embodiment, the photoelectric conversion layer may have a structure in which a donor layer, a donor-acceptor mixed layer, and an acceptor layer are sequentially stacked in the third direction Z, but is not limited thereto. When the light receiving element OPD is exposed to the external light, the photoelectric conversion layer OPL may generate photocharges, and the generated photocharges may be accumulated in the first electrode E1 of the light receiving element OPD. For example, the light receiving element OPD may be formed of a material capable of converting light energy into electrical energy.

The first electrode E1 of the light receiving element OPD and the pixel electrode AE of the light emitting element EL may be formed of substantially the same material. The hole transport layers HTL, the hole injection layers, the electron transport layers ETL, and the electron injection layers of the light receiving element OPD and the light emitting element EL may be formed of substantially the same material, but the present disclosure is not limited thereto. As described above, the above-described electrodes and layers are formed of substantially the same material through substantially the same process and the light receiving element OPD and the light emitting element EL share the common electrode CE with each other. Thus, the display panel 100 may be easily manufactured.

The encapsulation layer TFE may be disposed on the common electrode CE of the light emitting pixel SP (or the second electrode of the light receiving pixel LP). The encapsulation layer TFE may include at least one inorganic film to prevent oxygen or moisture from penetrating into each of the light emitting layer EML and the photoelectric conversion layer OPL. In addition, the encapsulation layer TFE may include at least one organic film to protect each of the light emitting layer EML and the photoelectric conversion layer OPL from foreign materials such as dust. For example, the encapsulation layer TFE may be formed in a structure in which a first inorganic film, an organic film, and a second inorganic film are sequentially stacked. The first inorganic film and the second inorganic film may be formed as multiple films in which one or more inorganic films of a silicon nitride layer, a silicon oxynitride layer, a silicon oxide layer, a titanium oxide layer, and an aluminum oxide layer are alternately stacked. The organic film may be an organic film made of an acryl resin, an epoxy resin, a phenolic resin, a polyamide resin, a polyimide resin, or another material.

A capping layer may be disposed between the common electrode CE and the encapsulation layer TFE. The capping layer may include an organic material. The capping layer may protect the common electrode CE from a subsequent process (e.g., a sputtering process) and improving emission efficiency of the light emitting element EL.

A black matrix BM may be disposed on the encapsulation layer TFE. The black matrix BM may prevent color mixing between the light emitting pixels SP. In addition, the black matrix BM may serve to transmit light reflected from a valley and a ridge adjacent to the light receiving element OPD in the third direction Z and block light reflected from a valley or a ridge relatively distant from the light receiving element OPD when the light reflected from the valley or the ridge of the finger enters the light receiving element OPD. The black matrix BM may include an opaque photosensitive organic material, but is not limited thereto.

A color filter CF layer may be disposed on the black matrix BM and the encapsulation layer TFE. The color filter CF layer may include a color filter CF layer of a first color (e.g., red), a color filter CF layer of a second color (e.g., blue), and a color filter CF layer of a third color (e.g., green). The color filter CF layer may serve as an optical system that allows light entering the light receiving pixel LP to be refracted and concentrated on the light receiving element OPD.

Figure 16:
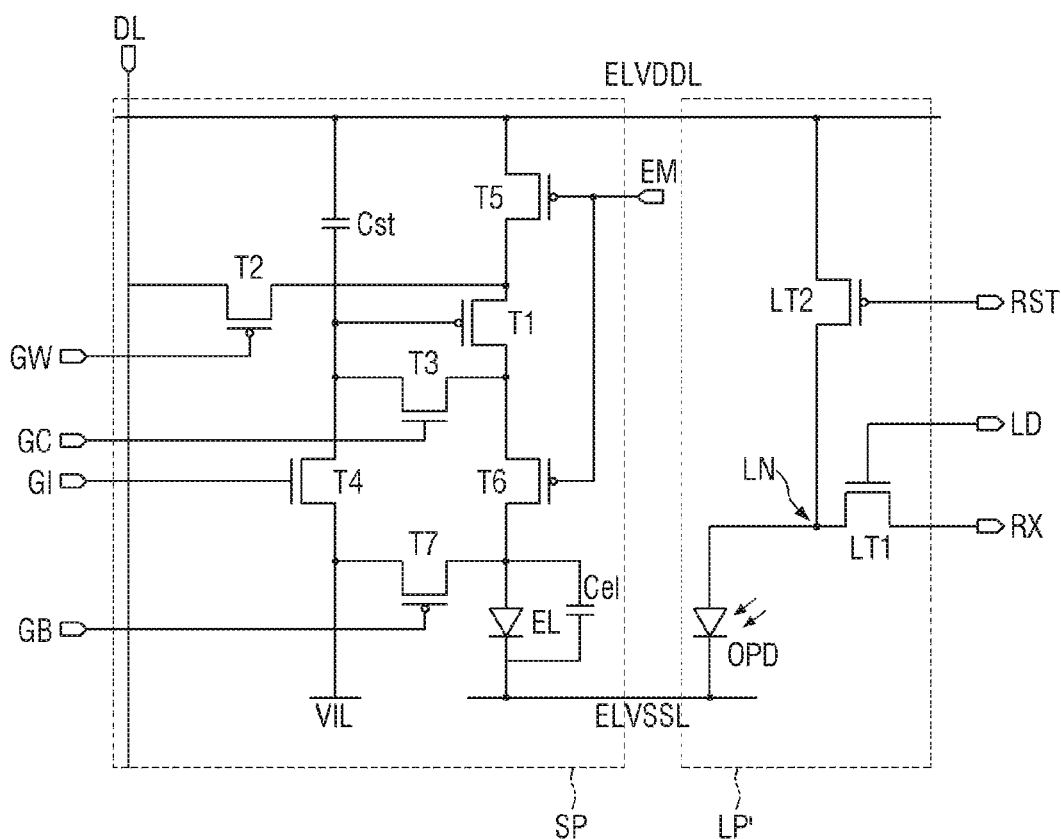
FIG. 16 illustrates an embodiment of a light emitting pixel and a light receiving pixel.

FIG. 16 is a circuit diagram of a light emitting pixel and a light receiving pixel according to another example embodiment. The example embodiment of FIG. 16 is different from an example embodiment of FIG. 7 in that each of the third transistor T3 and the fourth transistor T4 of the light emitting pixel SP and the sensing transistor LT1 of the light receiving pixel LP is formed as an N-type transistor and a fourth scan line GC for controlling turn-on and turn-off of the third transistor T3 is further included. In FIG. 16, contents different from those of an example embodiment of FIG. 7 will be mainly described.

Referring to FIG. 16, each of the third transistor T3 and the fourth transistor T4 (which include electrodes connected to the gate electrode of the first transistor T1 among the plurality of thin film transistors of the light emitting pixel SP) is an N-type transistor. The sensing transistor LT1 disposed between the sensing node LN and the fingerprint sensing line RX of the light receiving pixel LP is also an N-type transistor. An N-type transistor may have leakage current smaller than that of a P-type transistor. Accordingly, when the third transistor T3 and the fourth transistor T4 are formed as the N-type transistors, it is possible to prevent in advance a voltage of the gate electrode of the first transistor T1 from being fluctuated by the leakage current. In addition, the sensing transistor LT1 is formed as the N-type transistor. Thus, it is possible to prevent in advance a voltage of the sensing node LN from being fluctuated by the leakage current during the light exposure period EP.

The third transistor T3, the fourth transistor T4, and the sensing transistor LT1 are formed on substantially the same layer of the display panel 100, and thus, the display panel 100 may be easily manufactured.

A turn-on voltage and a turn-off voltage of the P-type transistor are different from a turn-on voltage and a turn-off voltage of the N-type transistor, respectively. A signal for controlling the P-type transistor and a signal for controlling the N-type transistor should be separated from each other. Accordingly, the light emitting pixel SP is connected to the fourth scan line GC for controlling the third transistor T3. The reset transistor LT2 may also be formed as an N-type transistor to prevent the voltage of the sensing node LN from being fluctuated by a leakage current of the reset transistor LT2.

Figure 17:
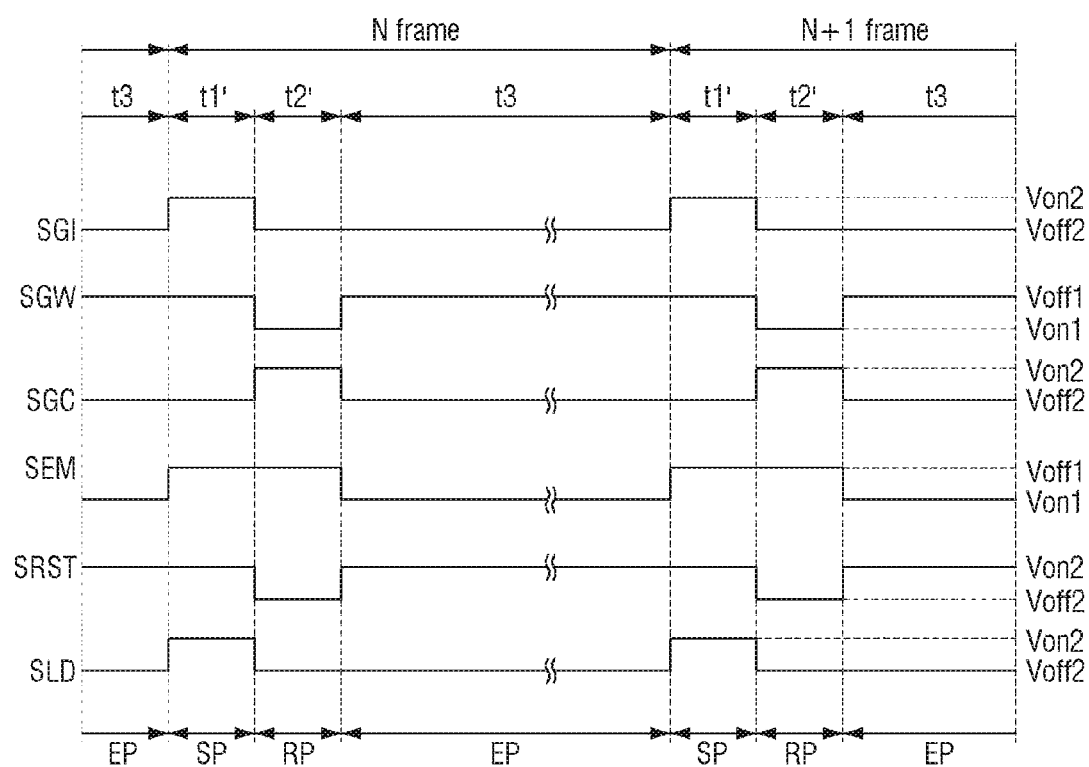
FIG. 17 illustrates an embodiment of signals applied to scan lines, an emission line, a reset line, and a fingerprint scan line.

FIG. 17 is a waveform diagram illustrating an example of signals applied to a first scan line, a second scan line, a fourth scan line, an emission line, a reset line, and a fingerprint scan line of FIG. 16. In FIG. 17, the gate-on voltage Von in FIG. 8 is referred to as a first gate-on voltage Von1, and the gate-off voltage Voff in FIG. 8 is referred to as a first gate-off voltage Voff1.

The first scan signal SGI may have a second gate-on voltage Von2 during the first period t1, in which a voltage of the gate electrode of the first transistor T1 is initialized to the initialization voltage Vint due to turn-on of the fourth transistor T4, and may have a second gate-off voltage Voff2 during the other periods.

The second gate-on voltage Von2 may be a high voltage for turning on the N-type transistor, and the second gate-off voltage Voff2 may be a low voltage for turning off the N-type transistor. The second gate-on voltage Von2 may be substantially the same as the first gate-off voltage Voff1, and the second gate-off voltage Voff2 may be substantially the same as the first gate-on voltage Von1, but the present disclosure is not limited thereto.

A fourth scan signal SGC may have a second gate-on voltage Von2 during the second period t2' in which the gate electrode and the second electrode of the first transistor T1 are connected to each other due to turn-on of the third transistor T3. Thus, the first transistor T1 is driven as a diode and may have a second gate-off voltage Voff2 during the other periods.

The fingerprint scan signal SLD applied to the sensing transistor LT1 may be substantially the same as the first scan signal SGI, as in FIG. 8. Accordingly, the sensing transistor LT1 may be turned on by the second gate-on voltage Von2 of the first scan signal SGI during the fingerprint sensing period SP corresponding to the second period t2, and may be turned off by the second gate-off voltage Voff2 of the first scan signal SGI during the other periods.

Also in this case, the reset period RP may be adjusted independently of the scan signals SGI, SGW, SGB, and SGB and the emission signal SEM. For example, a reset timing and the number of times by which the voltage of the sensing node LN and the first electrode of the light receiving element OPD of the light receiving pixel LP is reset to the first driving voltage ELVDD during the reset period RP may be adjusted. This may allow the light receiving element OPD to be in the forward bias state of the operating point or more before the light exposure period EP.

Figure 18:
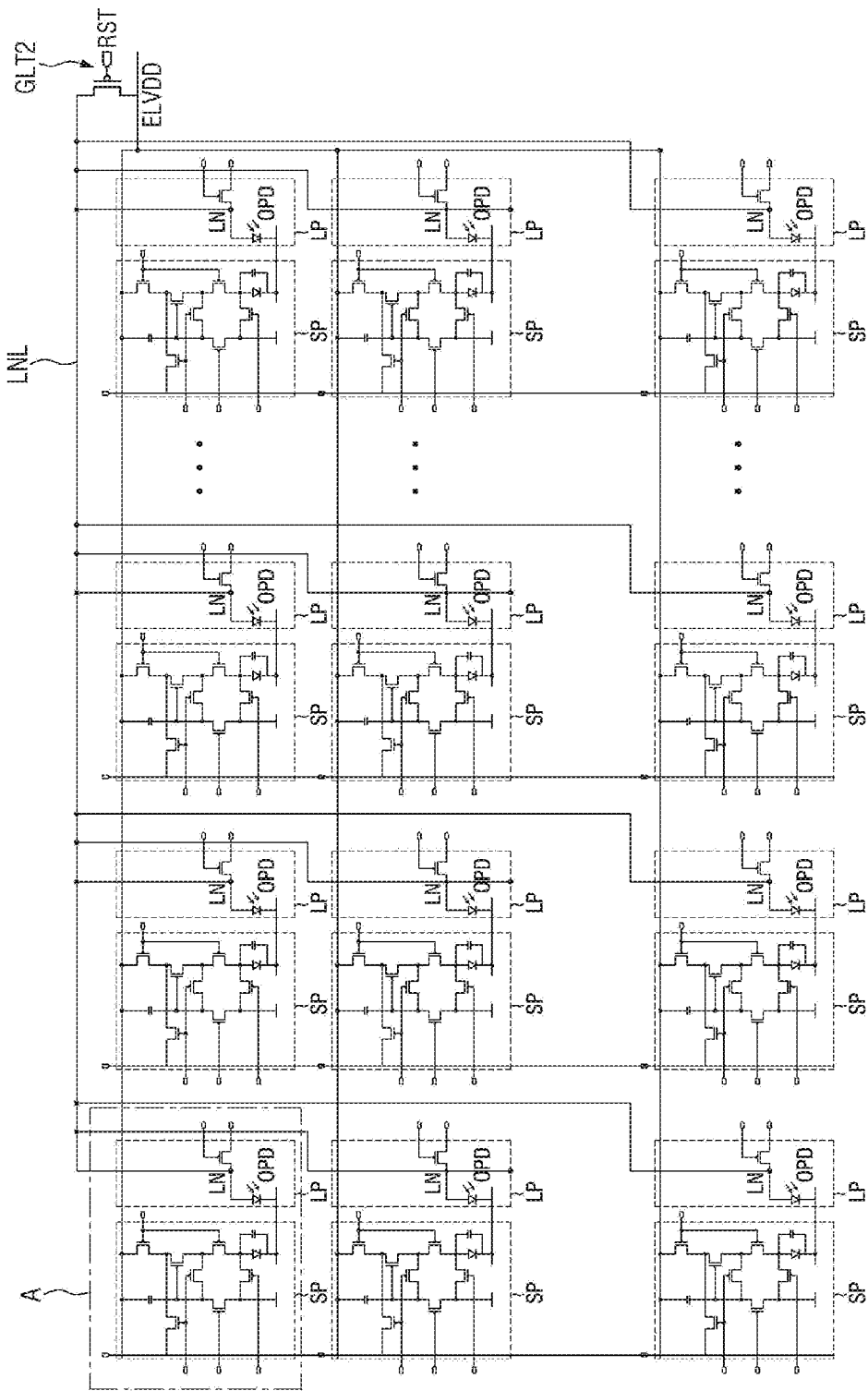
FIG. 18 illustrates an embodiment of light emitting pixels and light receiving pixels.
Figure 19:
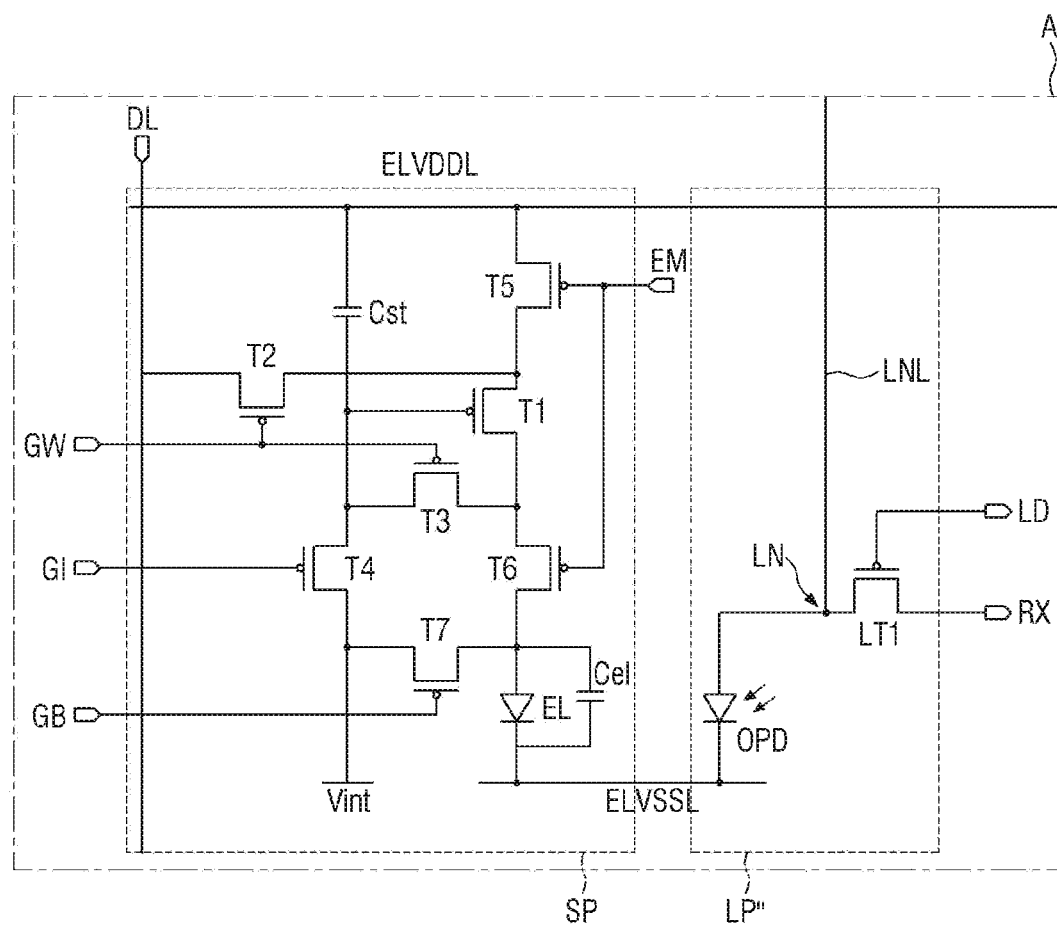
FIG. 19 illustrates an enlarged view of region A of FIG. 18.

FIG. 18 is a circuit diagram of a plurality of light emitting pixels and a plurality of light receiving pixels according to another example embodiment. FIG. 19 is an enlarged view of region A of FIG. 18. The example embodiment of FIG. 18 is different from the example embodiment of FIG. 7 in that sensing nodes LN of the respective light receiving pixels LP are connected to a global reset transistor GLT2 through connection lines LNL. In FIG. 18, contents different from those of an example embodiment of FIG. 7 will be mainly described.

Referring to FIGS. 18 and 19, in the plurality of light receiving pixels LP of the display panel 100 according to an example, the reset transistors LT2 are omitted. Also, the global reset transistor GLT2 that simultaneously resets the plurality of light receiving pixels LP and one reset line RST are included.

A gate electrode of the global reset transistor GLT2 is connected to the reset line RST, a first electrode of the global reset transistor GLT2 is connected to the first driving voltage line ELVDDL, and a second electrode of the global reset transistor GLT2 is connected to sensing electrodes of the respective light receiving pixels LP through the connection lines LNL. Accordingly, when a reset signal SRST having a gate-on voltage Von is applied to the reset line RST, voltages of the sensing nodes LN and the first electrodes of the light receiving elements OPD of all the respective light emitting elements LP may be simultaneously initialized to the first driving voltage ELVDD.

By simultaneously resetting the sensing nodes LN and the first electrodes of the light receiving elements OPD of all the light receiving pixels LP in the fingerprint sensing region FSA using the global reset transistor GLT2 and one reset line RST, areas of the light receiving pixels LP in plan view may be decreased. Accordingly, a width by which the light receiving pixel LP and the light emitting pixel SP are spaced apart from each other, a width by which the light receiving pixels LP are spaced apart from each other, and a width by which the light emitting pixels SP are spaced apart from each other, in the fingerprint sensing region FSA may be decreased. Such a structure may increase resolution in the fingerprint sensing region FSA and decreasing a manufacturing cost of the display panel 100.

However, a point in time when a voltage of the sensing node LN of each of the plurality of light receiving pixels LP and a voltage of the first electrode of each of the light emitting elements EL are initialized to the first driving voltage ELVDD may be positioned between the fingerprint sensing period SP and the light exposure period EP of each light receiving pixel LP.

Figure 20:
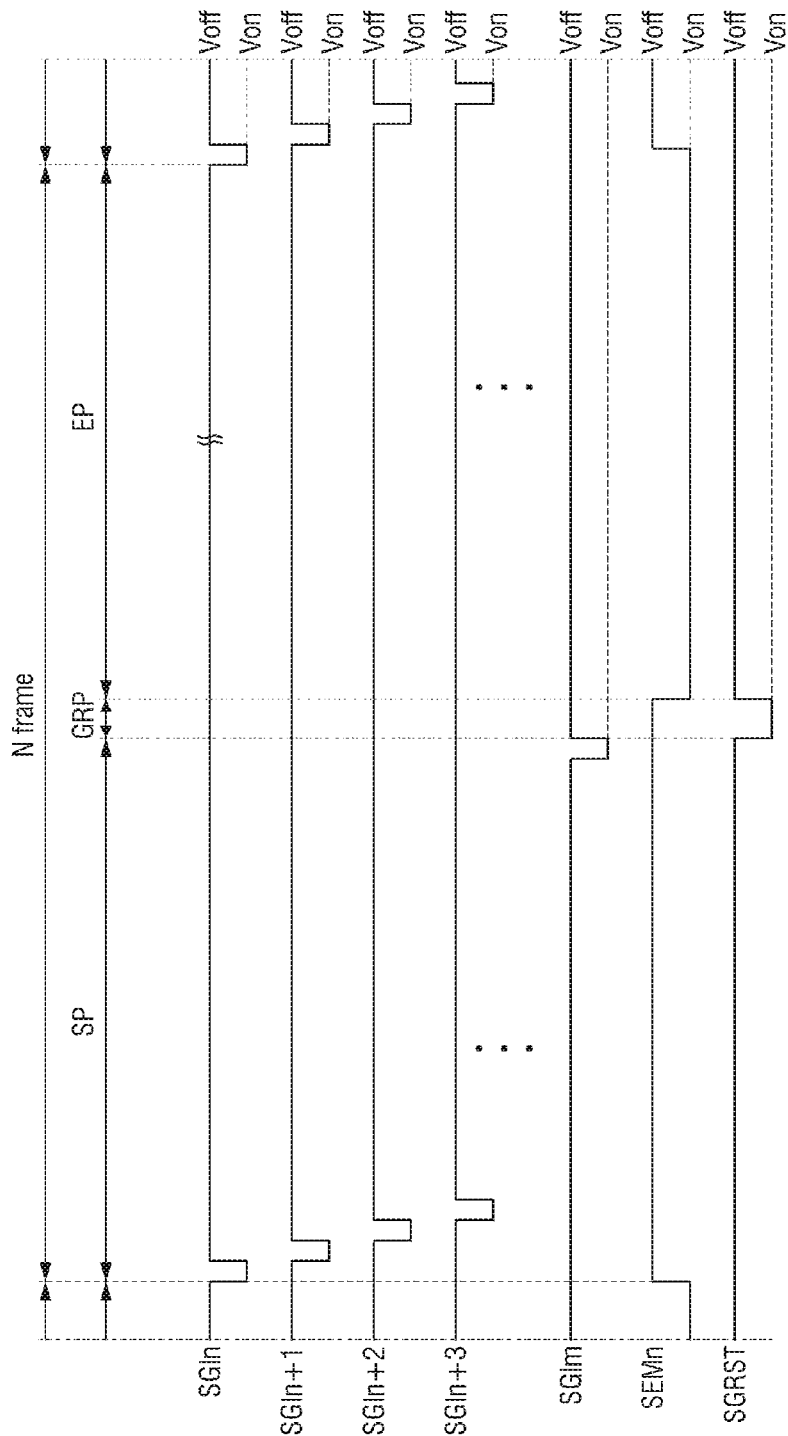
FIG. 20 illustrates an embodiment of scan signals applied to the light emitting pixels and light receiving pixels of FIG. 18 and a reset signal applied to the light receiving pixels of FIG. 18.

FIG. 20 is a waveform diagram illustrating an embodiment of scan signals applied to the light emitting pixels and the light receiving pixels of FIG. 18 and a reset signal applied to the light receiving pixels of FIG. 18. In FIG. 20, it has been illustrated that the fingerprint sensing region FSA (e.g., a region in which the light receiving elements OPD are disposed in the active region AR of the display panel 100) is disposed from an n-th row (n is a positive integer) of the display panel 100 to an m-th row (m is a positive integer greater than n).

In addition, for convenience of explanation, it has been illustrated that a first scan signal SGI applied to any row may correspond to a second scan signal SGW of the previous row. For example, a first scan signal SGIn+1 of an n+1-th row (n is a positive integer) may be substantially the same as a second scan signal SGWn of the n-th row. In other words, the first scan signal SGIn+1 of the n+1-th row may be substantially the same as the second scan signal SGWn of the n-th row, but is not limited thereto.

Referring to FIG. 20, the reset signal SGRST applied to the global reset transistor GLT2 may have a gate-on voltage Von after a fingerprint sensing period SP of a light receiving pixel LP of the m-th row, and may have a gate-off voltage Voff before a light exposure period EP of a light receiving pixel LP of the n-th row.

For example, the global reset signal SGRST applied to the global reset transistor GLT2 may have the gate-on voltage Von between a point in time when a first scan signal SGIm applied to the m-th row changes from a gate-on voltage Von to a gate-off voltage Voff and a point in time when an emission signal EMn applied to the n-th row changes from a gate-off voltage Voff to a gate-on voltage Von. However, the present disclosure is not limited thereto. In one embodiment, the global reset signal SGRST may also have the gate-on voltage Von in a period at least partially overlapping a period in which the emission signal EMn applied to the n-th row has the gate-on voltage Von.

In addition, since the global reset signal SGRST is controlled independently of the scan signals applied to each light emitting element EL, the global reset signal SGRST may include a plurality of first sub-global reset periods in which it has the gate-on voltage Von and at least one second sub-global reset period in which it has the gate-off voltage Voff, during a global reset period GRP. The first sub-global reset periods and the second sub-global reset period may be alternately repeated. Accordingly, during the global reset period GRP, the sensing node LN and the first electrode of the light receiving element OPD of each light receiving pixel LP may be initialized several times.

Figure 21:
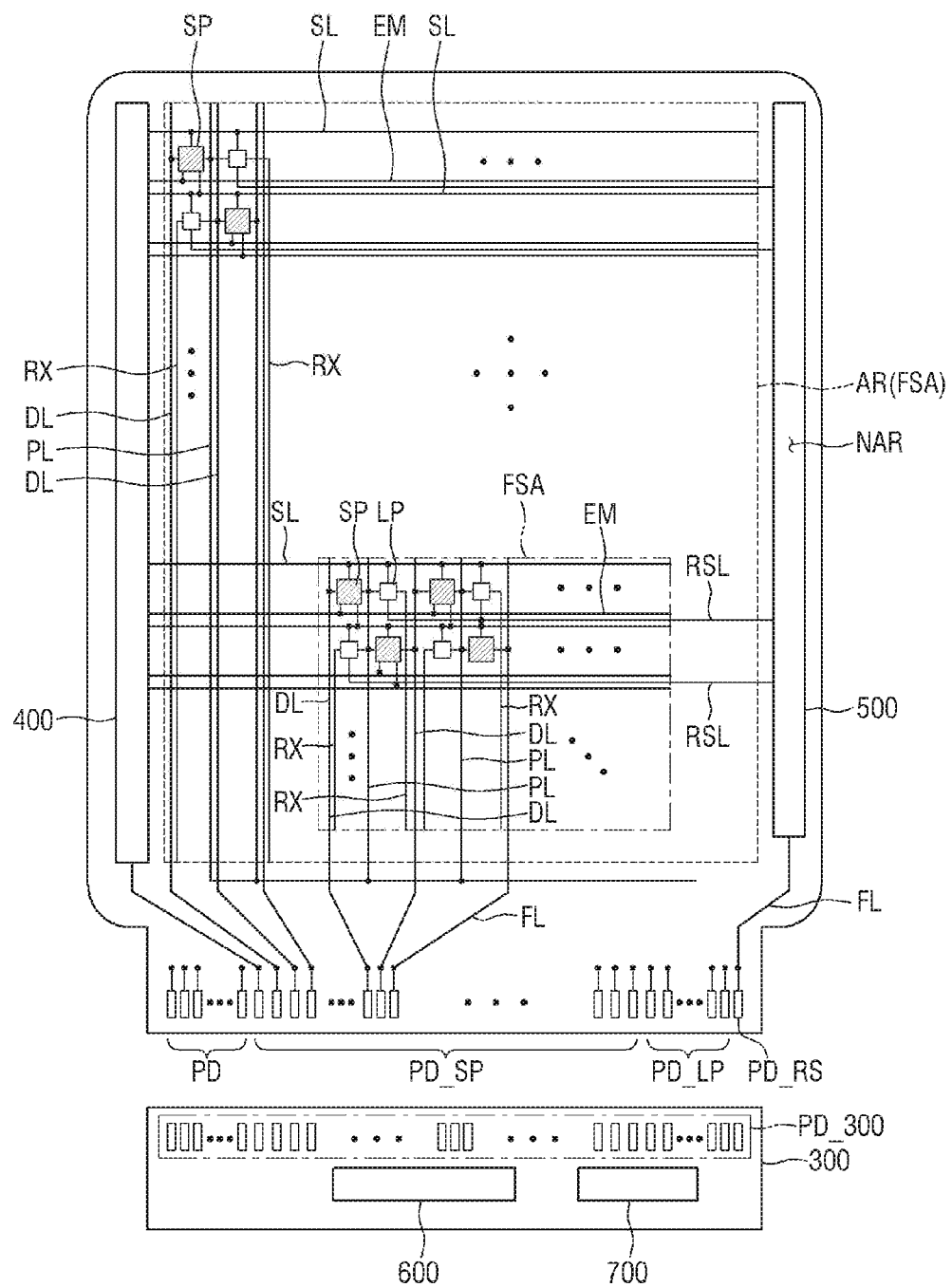
FIG. 21 illustrates an embodiment of a display panel.

FIG. 21 is a schematic plan view of a display panel according to another example embodiment. The example embodiment of FIG. 21 is different from the example embodiment of FIG. 4 only in that the fingerprint sensing region FSA of the display device corresponds to substantially the same region as the active region AR. An arrangement structure, a driving method, and a stacked structure of a plurality of light emitting pixels SP and a plurality of light receiving pixels LP in the fingerprint sensing region FSA may be substantially the same as those in an example embodiment of FIG. 4.

When the entire active region AR of the display device is defined as the fingerprint sensing region FSA as described above, a user's fingerprint sensing function is provided in the entire active region AR rather than a specific region of the active region AR. Thus, the user may conveniently use the use's fingerprint sensing function.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, devices, modules, units, multiplexers, generators, logic, interfaces, decoders, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been particularly shown and described with reference to embodiments thereof, it will be understood by those of ordinary skill in the art that various changes in form and detail may be made therein without departing from the spirit and scope of the present disclosure as defined by the following claims. The embodiments of the present disclosure described herein should be considered in a descriptive sense only and not for purposes of limitation. The embodiments may be combined to form additional embodiments.

What is claimed is:

1. A display device, comprising:
   light emitting pixels and light receiving pixels disposed in a display region; and
   a reset line, a fingerprint scan line, and a fingerprint sensing line disposed in the display region, wherein each of the light receiving pixels includes:
   a light receiving element including a first electrode and a second electrode;
   a sensing transistor configured to connect the first electrode of the light receiving element to the fingerprint sensing line according to a fingerprint scan signal applied to the fingerprint scan line; and
   a reset transistor configured to connect a first voltage source to the first electrode of the light receiving element according to a reset signal applied to the reset line, wherein the second electrode of the light receiving element is connected to a second voltage source, a first voltage applied to the first voltage source is greater than a second voltage applied to the second voltage source, and a third voltage applied to the fingerprint sensing line is greater than the second voltage and smaller than the first voltage.

2. The display device of claim 1, wherein the reset signal and the fingerprint scan signal are different signals.

3. The display device of claim 1, wherein the reset transistor is configured to be turned on twice or more during one frame period.

4. The display device of claim 1, wherein the light receiving element is configured to operate in a forward bias state during a period in which the reset transistor is turned on.

5. The display device of claim 1, wherein a voltage difference between the first voltage and the second voltage is greater than a threshold voltage of the light receiving element.

6. The display device of claim 5, wherein:
   the light receiving pixel further includes a sensing node disposed between the first electrode of the light receiving element and the sensing transistor, and
   a voltage of the sensing node increases during a period in which the light receiving pixel is exposed to light.

7. The display device of claim 1, further comprising:
   a first scan line, an initialization voltage line, and a second scan line,
   wherein each of the light emitting pixels includes:
   a light emitting element including a first electrode and a second electrode connected to the second voltage source;

a first transistor disposed between the light emitting element and the first voltage source; and a second transistor configured to initialize a voltage of a gate electrode of the first transistor to an initialization voltage of the initialization voltage line according to a first scan signal of the first scan line.

8. The display device of claim 7, wherein:
the first transistor is a P-type transistor, and
the sensing transistor and the second transistor are N-type transistors.

9. The display device of claim 7, wherein the first scan signal corresponds to the fingerprint scan signal.

10. The display device of claim 9, wherein the first scan signal and the reset signal are different signals.

11. The display device of claim 9, further comprising:
a data line connected to the light emitting pixel,
wherein each of the light emitting pixels further includes:
a third transistor configured to apply a data voltage of the data line to a first electrode of the first transistor according to a second scan signal of the second scan line; and
a fourth transistor configured to connect the gate electrode and a second electrode of the first transistor to each other according to the second scan signal, and
the second scan signal is a signal different from the first scan signal and the reset signal.

12. The display device of claim 11, wherein a period in which the reset transistor is turned on by the reset signal is longer than a period in which each of the third transistor and the fourth transistor is turned on by the second scan signal.

13. The display device of claim 11, wherein the reset transistor is configured to be turned on at least twice during a period in which the second transistor is turned on by the second scan signal.

14. A display device, comprising:
a plurality of fingerprint scan lines configured to receive first scan signals;
a plurality of fingerprint sensing lines;
a reset line configured to receive a reset signal;
a reset transistor configured to be controlled by the reset signal and including a first electrode connected to a first voltage source configured to receive a first voltage; and
light receiving pixels, each connected to one of the plurality of fingerprint scan lines, one of the plurality of fingerprint sensing lines, and a second voltage source configured to receive a second voltage smaller than the first voltage,
wherein each of the light receiving pixels includes:
a light receiving element including a first electrode and a second electrode, the second electrode connected to the second voltage source;
a sensing transistor configured to connect the first electrode of the light receiving element to the fingerprint sensing line according to a scan signal applied to the fingerprint scan line; and a connection line connecting the first electrode of the light receiving element to a second electrode of the reset transistor, wherein the plurality of fingerprint sensing lines are configured to receive a third voltage smaller than the first voltage and greater than the second voltage.

15. The display device of claim 14, wherein a period in which the sensing transistor is turned on by the first scan signals and a period in which the reset transistor is turned on by the reset signal do not overlap each other.

16. A display device, comprising:
a display region having a fingerprint sensing region therein; and
a non-display region disposed adjacent to the display region,
wherein the fingerprint sensing region includes a plurality of light emitting pixels and a plurality of light receiving pixels alternately arranged in a matrix direction, each of the plurality of light emitting pixels includes:
a light emitting element including a first electrode and a second electrode;
a first transistor disposed between the light emitting element and a first voltage source; and
a second transistor configured to initialize a voltage of a gate electrode of the first transistor to an initialization voltage of an initialization voltage line according to a first scan signal of a first scan line, and
each of the plurality of light receiving pixels includes:
a light receiving element including a first electrode and a second electrode connected to a second voltage source;
a sensing transistor configured to connect the first electrode of the light receiving element to a fingerprint sensing line according to a fingerprint scan signal applied to a fingerprint scan line; and
a reset transistor configured to connect the first voltage source to the first electrode of the light receiving element according to a reset signal applied to a reset line, wherein the second electrode of the light emitting element is connected to the second voltage source.

17. The display device of claim 16, wherein the light receiving element is configured to operate in a forward bias state during a period in which the reset transistor is turned on by the reset signal.

18. The display device of claim 16, wherein the first scan signal and the reset signal are different signals.

19. The display device of claim 18, wherein:
each of the plurality of light emitting pixels includes a third transistor configured to apply a data voltage of a data line to a first electrode of the first transistor according to a second scan signal of a second scan line, and
the second scan signal is a signal different from the first scan signal and the reset signal.

20. The display device of claim 19, wherein the second scan signal corresponds to the fingerprint scan signal.

* * * * *